United States Patent
Chen et al.

(10) Patent No.: US 9,886,734 B2
(45) Date of Patent: Feb. 6, 2018

(54) TECHNIQUES FOR GRAPHICS DATA PREFETCHING

(71) Applicant: Intel Corporation, Santa Clara, CA (US)

(72) Inventors: Wei-Yu Chen, Santa Clara, CA (US); Guei-Yuan Lueh, San Jose, CA (US); Subramaniam Maiyuran, Gold River, CA (US)

(73) Assignee: INTEL CORPORATION, Santa Clara, CA (US)

( * ) Notice: Subject to any disclaimer, the term of this patent is extended or adjusted under 35 U.S.C. 154(b) by 499 days.

(21) Appl. No.: 13/870,924

(22) Filed: Apr. 25, 2013

(65) Prior Publication Data

US 2014/0320509 A1   Oct. 30, 2014

(51) Int. Cl.
*G06T 1/00* (2006.01)
*G06T 1/20* (2006.01)

(52) U.S. Cl.
CPC ..................................... *G06T 1/20* (2013.01)

(58) Field of Classification Search
CPC .............................. G06T 15/04; G06F 12/0862
See application file for complete search history.

(56) References Cited

U.S. PATENT DOCUMENTS

| | | | | |
|---|---|---|---|---|
| 2003/0009623 A1* | 1/2003 | Arimilli | | G06F 12/0813 711/119 |
| 2004/0260877 A1* | 12/2004 | Hooker | | G06F 12/0815 711/118 |
| 2007/0283106 A1* | 12/2007 | Kalogeropulos | | G06F 8/4442 711/154 |
| 2008/0091921 A1* | 4/2008 | Abuaiadh | | G06F 9/30043 712/207 |
| 2009/0077350 A1* | 3/2009 | Saraswati | | G06F 9/383 712/207 |
| 2009/0113402 A1* | 4/2009 | Chen et al. | | 717/140 |
| 2010/0070716 A1* | 3/2010 | Toyoshima | | G06F 9/30047 711/137 |
| 2010/0169606 A1* | 7/2010 | Deneau | | 711/204 |
| 2013/0187920 A1* | 7/2013 | Osman | | 345/426 |
| 2013/0263172 A1* | 10/2013 | McCoy et al. | | 725/27 |

OTHER PUBLICATIONS

Nadeau Software Consulting, "C/C++ tip: How to loop through multi-dimensional arrays quickly", http://nadeausoftware.com/articles/2012/06/c_c_tip_how_loop_through_multi_dimensional_arrays_quickly, Archived version retrieved from Sep. 24, 2012 at https://web.archive.org/web/20120924052736/http://nadeausoftware.com/articles/2012/06/c_c_tip_how_lo.*

Shiffman, D., "Learning Processing: A Beginners Guide to Programming Images, Animation, and Interaction", 2008, Morgan Kaufmann/Elsevier, pp. 25-26 and 262-264.*

* cited by examiner

*Primary Examiner* — Phi Hoang

(57) ABSTRACT

Various embodiments are generally directed to techniques to prefetch pixel data of one or more pixels adjacent to a pixel for which pixel data is retrieved where the prefetched pixel data may be stored in noncontiguous storage locations. A device comprising a processor component and a hint generation component executed by the processor component to embed a prefetch hint in an executable read instruction, the executable read instruction to retrieve pixel data of a specified pixel and the prefetch hint to retrieve pixel data of an adjacent pixel that is geometrically adjacent to the specified pixel. Other embodiments are described and claimed.

25 Claims, 12 Drawing Sheets

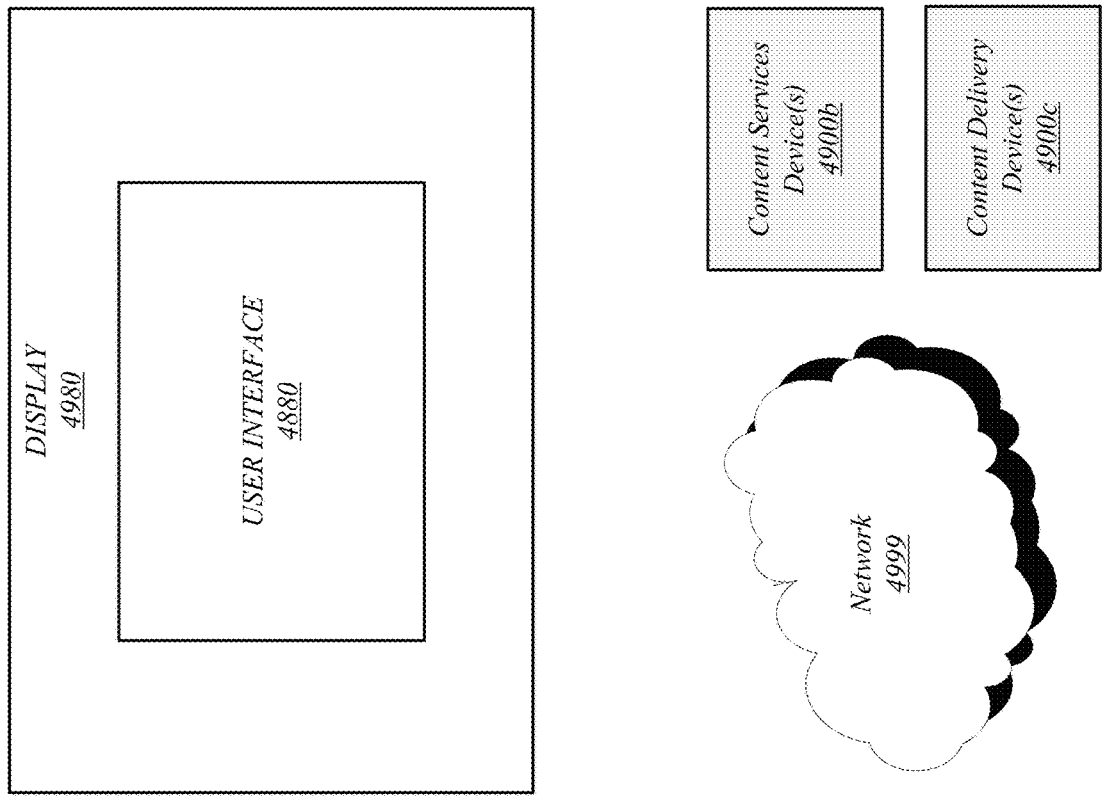
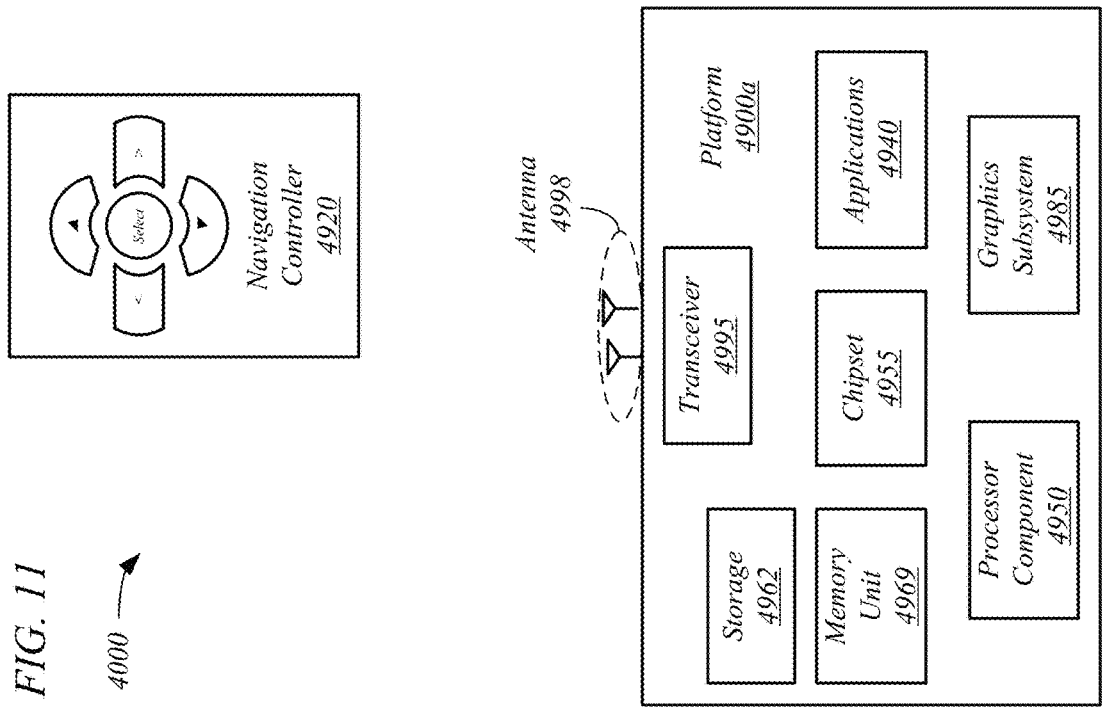
FIG. 11

TECHNIQUES FOR GRAPHICS DATA PREFETCHING

BACKGROUND

In performing processing operations on graphics data, the multi-dimensional nature of the graphics data often results in frequently recurring instances of reading pixel data of a pixel map (e.g., a two-dimensional array of pixels making up an image, a texture, etc.) from noncontiguous locations in storage. This arises from a common tendency to store pixel data of pixels of a pixel map in a manner organized to follow the arrangement of rows and columns of pixels into which the pixels themselves are organized in that pixel map. Such organization often means that pixel data for pixels that are adjacent in one dimension are usually stored in contiguous storage locations such that they are addressable at adjacent address locations, while pixel data for pixels that are adjacent in another dimension are usually stored in noncontiguous storage locations.

Thus, for example, when retrieving pixel data of pixels along a common row, the pixel data for adjacent pixels along that row may be stored at adjacent addressable storage locations in a storage, while the pixel data for adjacent pixels in other rows above or below is not. Yet, multi-dimensional graphics operations that require data from pixels that are adjacent to a particular pixel in multiple dimensions require retrieval of pixel data for those adjacent pixels, whether the storage locations corresponding to those adjacent pixels are contiguously located in a storage or not.

Typical prefetching mechanisms, whether implemented in a compiler or within a prefetching component of a processor component, do not recognize the multi-dimensional nature of graphics data and therefore cannot predict addresses of noncontiguous storage locations within a storage from which pixel data should be prefetched. This lack of ability to prefetch pixel data from noncontiguous storage locations results in a slowing of the rate in which multi-dimensional graphics operations may be performed, as latencies of accesses to noncontiguous storage locations must be awaited before performance of such graphics operations may be completed.

BRIEF DESCRIPTION OF THE DRAWINGS

FIG. 11 illustrates another alternate embodiment of a graphics processing system.

DETAILED DESCRIPTION

Figure 1:
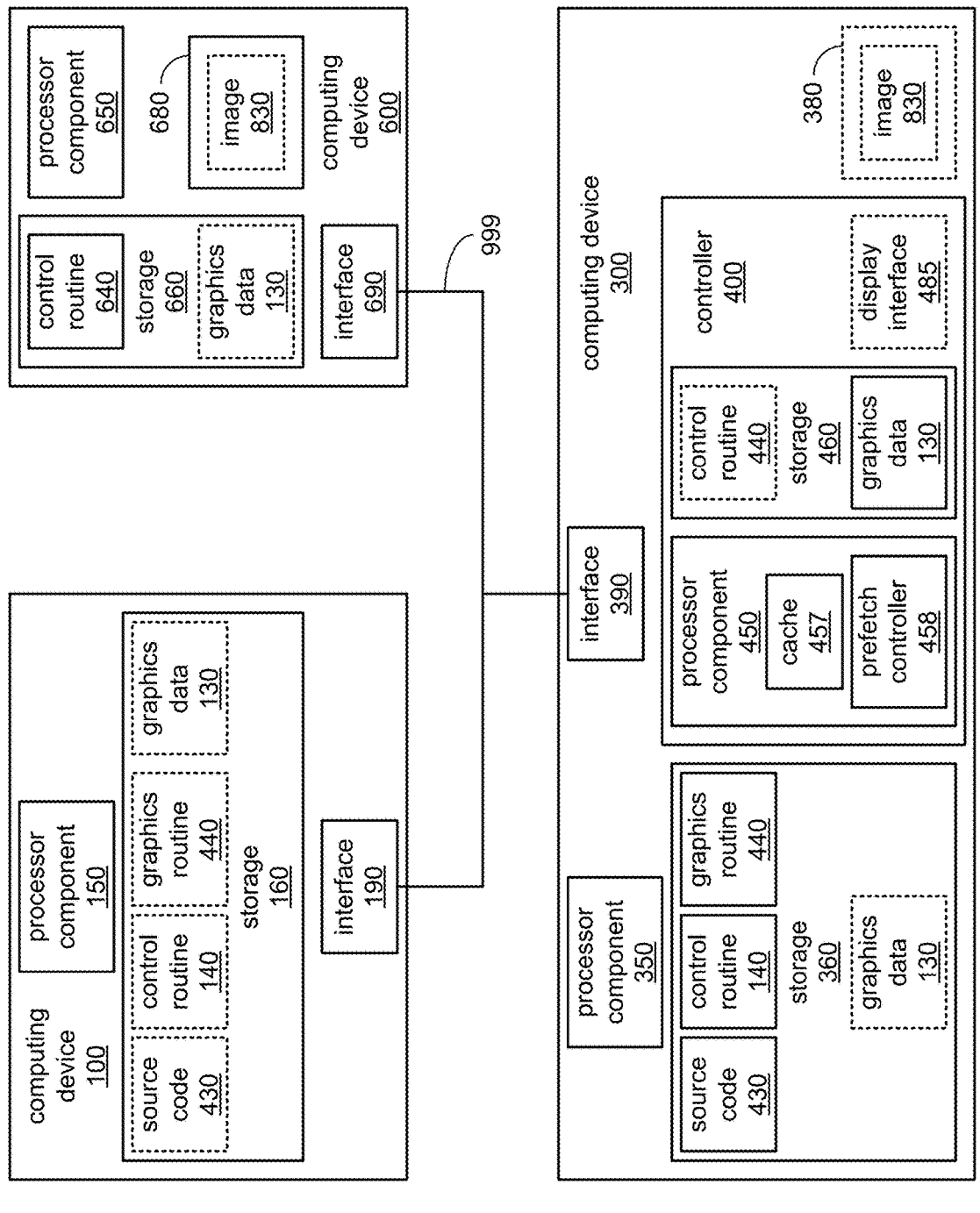
FIG. 1 illustrates an embodiment of a graphics processing system.

Various embodiments are generally directed to techniques for prefetching pixel data of one or more pixels adjacent to a pixel for which pixel data is retrieved where the prefetched pixel data may be stored in noncontiguous storage locations. More specifically, a read instruction to retrieve pixel data for one pixel of a pixel map includes a compiler-generated prefetch hint to a prefetch controller of a processor component executing instructions of a graphics routine to prefetch pixel data of one or more adjacent pixels to mitigate effects of a latency in retrieving pixel data from storage locations in which the pixel data is stored.

The embedding of a prefetch hint of a read instruction avoids the generation and use of a separate prefetch hint instruction, thereby avoiding lengthening sequences of executable instructions through the addition of such separate instructions. Further, such embedding of a prefetch hint may be done by employing bits of a read instruction that are otherwise unused and/or otherwise ignored by a processor component. A prefetch hint is, in essence, a suggestion to the prefetch controller that performance in executing instructions may be increased if a piece of data indicated in the prefetch hint is prefetched, but is not a requirement to do so. The provision of a prefetch hint that may or may not be acted upon by the prefetch controller of the processor component, instead of requiring a prefetch to be carried out, enables the prefetch controller to use the prefetch hint as an input along with other inputs to independently determine what prefetches should be made to fill one or more cache lines and/or when to make those prefetches. Stated differently, the prefetch controller is allowed to prioritize the hinted prefetch versus other prefetches and/or ignore the hint entirely. The bits of the read instruction employed to convey the prefetch hint may be selected as a result of being bits of the read instruction that are ignored by an earlier generation of processor component that is not configured to recognize and act upon the embedded prefetch hint, while a later generation of processor component that is configured to recognize and act upon the embedded prefetch hint is able to do so. Thus, compiled code that includes such a read instruction with such an embedded prefetch hint is executable by both generations of processor component.

The compiler parses source code (e.g., human-readable texts of instructions to be compiled to generate a sequence of executable instructions) to at least identify instructions that define nested loops that include a read instruction that are often used to read pixel data of pixels of a pixel map where the pixel data has been organized in a storage in a manner corresponding to a row-column arrangement of pixels in that pixel map. The compiler determines the direction along the rows and columns in which pixel data is specified in the nested loops to be read. The compiler then generates executable instructions corresponding to those in the source code including executable instructions to implement the nested loops and an executable read instruction corresponding to the read instruction within the nested loops into which the compiler embeds a prefetch hint. In analyzing nested loops, the compiler may additionally analyze definitions of data structures associated with those nested loops as part of identifying instances in which nested loops are employed to read pixel data.

With general reference to notations and nomenclature used herein, portions of the detailed description which follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result.

These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 illustrates a block diagram of an embodiment of a graphics processing system 1000 incorporating one or more of computing devices 100, 300 and 600. Each of these computing devices may be any of a variety of types of computing device, including without limitation, a desktop computer system, a data entry terminal, a laptop computer, a netbook computer, a tablet computer, a handheld personal data assistant, a smartphone, a digital camera, a body-worn computing device incorporated into clothing, a computing device integrated into a vehicle (e.g., a car, a bicycle, a wheelchair, etc.), a server, a cluster of servers, a server farm, etc.

As depicted, these computing devices 100, 300 and 600 exchange signals conveying source code and/or executable code that includes instructions to retrieve pixel data of pixels in a pixel map, and/or the pixel map through a network 999. However, one or more of these computing devices may exchange other data entirely unrelated to retrieving pixel data with each other and/or with still other computing devices (not shown) via the network 999. In various embodiments, the network may be a single network possibly limited to extending within a single building or other relatively limited area, a combination of connected networks possibly extending a considerable distance, and/or may include the Internet. Thus, the network 999 may be based on any of a variety (or combination) of communications technologies by which signals may be exchanged, including without limitation, wired technologies employing electrically and/or optically conductive cabling, and wireless technologies employing infrared, radio frequency or other forms of wireless transmission.

In various embodiments, the computing device 300 incorporates one or more of a processor component 350, a storage 360, a display 380, a controller 400 and an interface 390 to couple the computing device 300 to the network 999. The storage 360 stores one or more of a graphics data 130, a control routine 140, a source code 430 and a graphics routine 440. The controller 400 incorporates one or more of a processor component 450, a storage 460 and a display interface 485. The processor component 450 incorporates a cache 457 and a prefetch controller 458. The storage 460 stores one or more of the graphics data 130 and the graphics routine 440.

Figure 3:
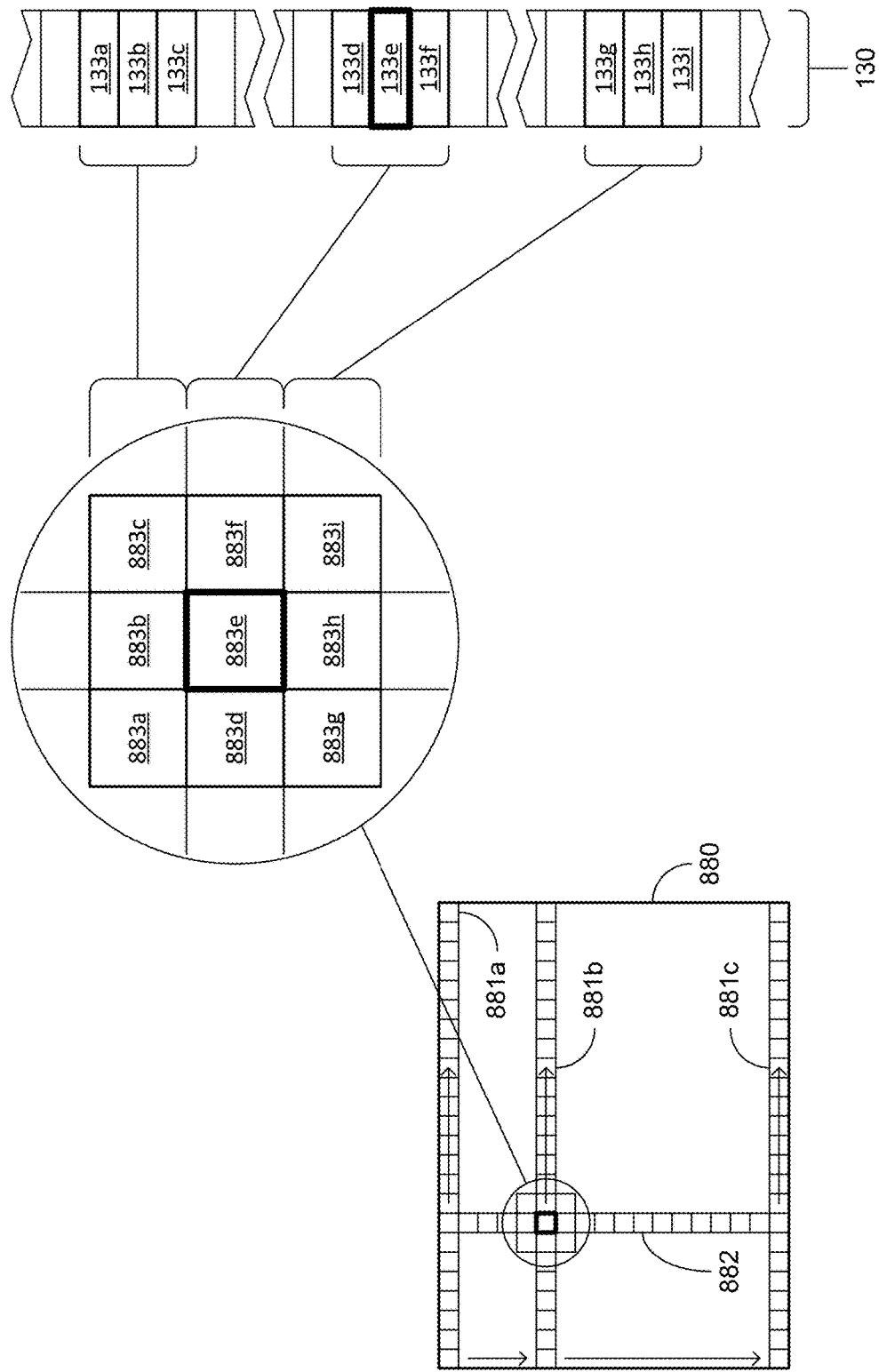
FIG. 3 illustrates relationships between positions of pixels in a pixel map and storage locations of pixel data in an embodiment.

Turning briefly to FIG. 3, as depicted, the graphics data 130 incorporates pixel data representative of the pixels of a two-dimensional pixel map 880 made up of pixels organized into rows and columns, including a top row 881*a*, a bottom row 881*c*, still another row 881*b*, and a column 882. A pixel 883*e* is positioned at the intersection of the row 881*b* and the column 882, and is surrounded by pixels 883*a-d* and 883*f-i*. The pixel map 880 may be any of a variety of types of pixel map, including and not limited to, a two-dimensional bitmap of an image, a texture map of pixel color values used to apply textures to computer-generated three-dimensional objects during rendering, a gradient map created from convolving a transform (e.g., a Gaussian transform) across pixels of a different pixel map, etc.

As also depicted within the graphics data 130, pixel data is organized in a manner that corresponds to the row-column organization of the pixels making up the pixel map 880 (including the pixels 883*a-i*). As those skilled in the art of authoring graphics routines will readily recognize, such an organization of pixel data is a highly prevalent practice. This prevalence is due, in part, to a tendency to think of storing and retrieving pixel data in an order that corresponds to the manner in which typical raster-scan graphics systems retrieve pixel data for transmission to a display. Such an order starts in the upper left-hand corner of a pixel map, proceeds rightward across the top row of pixels, and iterates a row at a time downward through the rows to the bottom row, proceeding rightward across the pixels in each of those rows. This prevalence is also due, in part, to the tendency to define the data structures employed to store pixel data in source code as two-dimensional arrays in which each element of the array at which pixel data for a single pixel is stored is specified with a pair of indices given ranges of index values that often correspond to the dimensions of a pixel map. Compilers typically respond to definitions of two-dimensional arrays in source code by allocating a single contiguous block of storage locations in a storage (e.g., the storage 360 or 460) organized in a manner that corresponds to a nested incrementing of the two indices in which one index is treated as specifying one of a row or column, and the other index is treated as specifying the other of the row or column Such a row-column organization is typically maintained even as the data structure is transferred from one storage device to another.

Thus, as depicted, pixel data 133*a-c* corresponding to the horizontally adjacent pixels 883*a-c*, respectively, are stored in contiguous storage locations that are adjacently addressable. Similarly, pixel data 133*d-f* corresponding to the horizontally adjacent pixels 883*d-f*, respectively, are stored in contiguous storage locations that are adjacently addressable. Further, pixel data 133*g-i* corresponding to the horizontally adjacent pixels 883g-i, respectively, are stored in contiguous storage locations that are also adjacently addressable. However, as also depicted, the storage locations in which the pixel data 133a-c are stored are not contiguous with the storage locations in which the pixel data 133d-f are stored, which in turn, are not contiguous with the storage locations in which the pixel data 133g-i. As a result of the organization of storage locations in which the pixel data of the pixels of the pixel map 880 are arranged to follow the row-column organization of those pixels, the storage locations of the pixel data 133a-c are separated from the storage locations of the pixel data 133d-f by the pixel data of others of the pixels of the rows in which the corresponding pixels 883a-c and 883d-f are located.

Therefore, although the pixel 883e is geometrically adjacent to all four of pixels 883b, 883d, 883f and 883h in the pixel map 880, only the pixel data 133d and 133f corresponding to the pixels 883d and 883f, respectively, are stored at addressably adjacent (e.g., contiguous) storage locations of whatever storage in which the graphics data 130 is stored (e.g., the storage 360 or 460). The pixel data 133b and 133h corresponding to the pixels 883b and 883h, respectively, are stored in storage locations that are not addressably adjacent to (e.g., not contiguous with) the storage location in which the pixel data 133e of the pixel 883e is stored.

It should be noted that although horizontally adjacent pixels are depicted and discussed as having their pixel data stored in addressably adjacent storage locations while vertically adjacent pixels are depicted and discussed as having their pixel data stored in storage locations that are not addressably adjacent, the reverse situation may alternatively exist. Stated differently, depending on the manner in which a data structure to store pixel data is defined, it may be that vertically adjacent pixels have their pixel data stored in addressably adjacent storage locations while horizontally adjacent pixels do not. It should also be noted that although the order in which pixel data is retrieved for pixels of a pixel map is described and depicted herein in various examples as starting with an "upper left-hand corner" and proceeding rightward through rows, one at a time, starting with the top row, pixel data of pixels in a pixel map may be retrieved in an entirely different order. By way of example, the retrieval of pixel data may begin at a pixel at a different corner and/or may proceed upward or downward through columns, one at a time, starting at either the leftmost or rightmost column. Therefore, the embodiments are not limited in either of these respects.

Returning to FIG. 1, the graphics routine 440 incorporates a sequence of instructions operative on the processor component 450 in its role as a controller processor component of the controller 400 of the computing device 300 to implement logic to perform various functions. In executing the graphics routine 440, the processor component 450 retrieves pixel data of pixels of the pixel map 880 of the graphics data 130 from storage locations of the storage 460 as specified by a recurringly executed read instruction located within nested loops defined by other instructions of the graphics routine 440. The read instruction directs the processor component 450 to retrieve pixel data for a specific pixel. However, as will be explained in greater detail, this read instruction also incorporates a prefetch hint that may be employed by the prefetch controller 458 to prefetch pixel data for pixels that are geometrically adjacent to that specified pixel of the read instruction and to store the prefetched pixel data in the cache 457.

In executing the graphics routine 440, the processor component 450 may further operate the display interface 485 to transmit a signal conveying an image 830 to be visually presented by the display 380. Where the graphics data 130 represents an image bitmap, the image 830 may be the image represented by that image bitmap. Alternatively, the image 830 may be derived via one or more graphics processing steps from the graphics data 130. The graphics data 130 may have been previously created by one or both of the processor components 350 and 450, or may have been received by the computing device 300 from another computing device (e.g., the computing device 100).

The control routine 140 incorporates a sequence of instructions operative on the processor component 350 in its role as a main processor component of the computing device 300 to implement logic to perform various functions. In executing the control routine 140, the processor component 350 compiles the source code 430 to generate the graphics routine 440 to be executed by the processor component 450. In so doing, the processor component 350 parses the source code 430 to identify instances of nested loops in which a read instruction is recurringly executed to retrieve data from a data structure in a manner consistent with the row-column order of data retrieval typically encountered in the reading of pixel data of a pixel map, as has been discussed. As will be explained in greater detail, upon identifying such nested loops with such a read instruction therein, the processor component 350 is caused to generate a corresponding read instruction in the graphics routine 440 into which is embedded the earlier-discussed prefetch hint that is also generated by the processor component 350 and that may be employed by the prefetch controller 458 of the processor component 450.

In various embodiments, the computing device 100 incorporates one or more of a processor component 150, a storage 160 and an interface 190 to couple the computing device 100 to the network 999. The storage 160 stores one or more of a graphics data 130, a control routine 140, a source code 430 and a graphics routine 440. In embodiments in which the computing device 100 is present, the compiling of the source code 430 to generate the graphics routine 440 with one or more read instructions incorporating a prefetch hint may be performed by the processor component 150 of the computing device 100, instead of by the processor component 350 of the computing device 300.

Thus, the control routine 140 may incorporate a sequence of instructions operative on the processor component 150 to implement logic to perform various functions. In executing the control routine 140, the processor component 150 may compile the source code 430 to generate the graphics routine 440. Thus, it may be the processor component 150 that identifies the aforedescribed instances of nested loops, and generates a corresponding read instruction in the graphics routine 440 into which the earlier-discussed prefetch hint (also generated by the processor component 150) is embedded. Upon completion of such compiling, the processor component 150 may operate the interface 190 to transmit the graphics routine 440 to the computing device 300 for execution, possibly along with the graphics data 130.

In various embodiments, the computing device 600 incorporates one or more of a processor component 650, a storage 660 and an interface 690 to couple the computing device 600 to the network 999. The storage 660 stores one or more of the graphics data 130 and a control routine 640. In embodiments in which the computing device 600 is present, the visual presentation of the image 830 may be performed by the processor component 650 of the computing device 600, instead of by the processor component 450 of the controller 400 of the computing device 300.

Thus, the control routine 640 may incorporate a sequence of instructions operative on the processor component 650 to implement logic to perform various functions. In executing the control routine 640, the processor component 650 may display the image 830, either as it is represented by pixel data of the pixels of the pixel map 880 of the graphics data 130, or as derived via one more graphics processing steps from the graphics data 130. The processor component 650 may operate the interface 690 to receive signals transmitting the graphics data 130 from the computing device 300.

Figure 2:
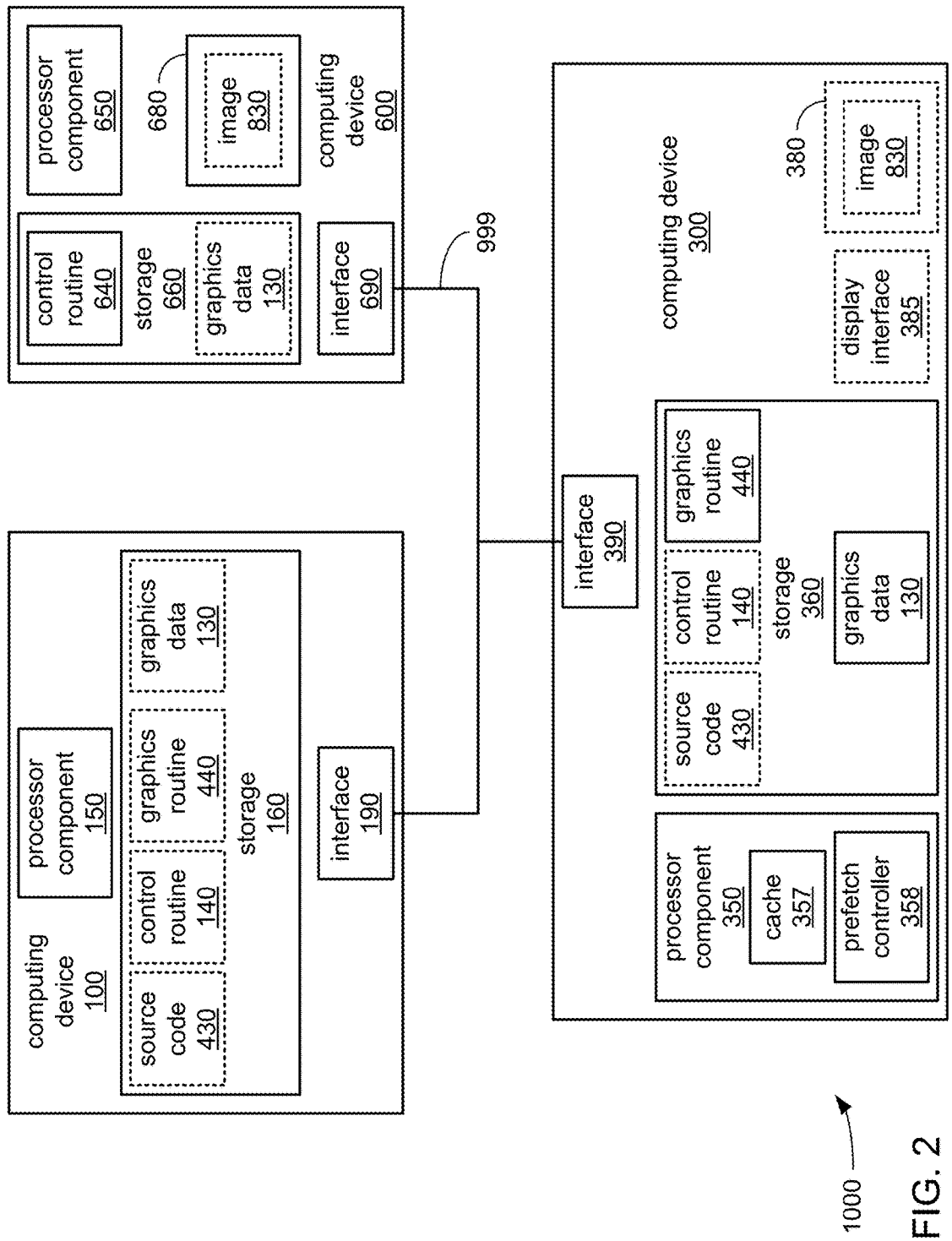
FIG. 2 illustrates an alternate embodiment of a graphics processing system.

FIG. 2 illustrates a block diagram of an alternate embodiment of the graphics processing system 1000 that includes an alternate embodiment of the computing device 300. The embodiment of the graphics processing system 1000 depicted in FIG. 2 is similar to the embodiment depicted in FIG. 1 in many ways, and thus, like reference numerals are used to refer to like elements throughout. However, unlike the computing device 300 of FIG. 1, the computing device 300 of FIG. 2 does not incorporate the controller 400. Also unlike the computing device 300 of FIG. 1, it is the processor component 350, incorporating a cache 357 and a prefetch controller 358, that executes the graphics routine 440 in lieu of there being a processor component 450 to do so. Further, in embodiments in which the computing device 300 visually presents the image 830, a display interface 385 is employed to do so, in lieu of the display interface 485.

Thus, in the embodiment of the graphics processing system 1000, the processor component 350 may both generate the graphics routine 440 from compiling the source code 430 and execute the graphics routine 440. Alternatively, in a manner similar to what was discussed in reference to the embodiment of the graphics processing system 1000 of FIG. 1, processor component 150 of the computing device 100 of the graphics processing system 1000 of FIG. 2 may compile the source code 430 to generate the graphics routine 440 for execution by the processor component 350 of the computing device 300.

In various embodiments, each of the processor components 150, 350, 450 and 650 may include any of a wide variety of commercially available processors. Further, one or more of these processor components may include multiple processors, a multi-threaded processor, a multi-core processor (whether the multiple cores coexist on the same or separate dies), and/or a multi-processor architecture of some other variety by which multiple physically separate processors are in some way linked.

Although each of the processor components 350 and 450 may include any of a variety of types of processor, it is envisioned that the processor component 350 of the computing device of FIG. 1 that the processor component 350 may be somewhat specialized and/or optimized to perform tasks related to graphics and/or video. More broadly, it is envisioned that the controller 400 incorporates is a graphics subsystem of the computing device 300 to enable the performance of tasks related to graphics rendering, video decompression, image resealing, etc., using components separate and distinct from the processor component 350 and its more closely related components.

In various embodiments, each of the storages 160, 360, 460 and 660 may be based on any of a wide variety of information storage technologies, possibly including volatile technologies requiring the uninterrupted provision of electric power, and possibly including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, the interfaces 190, 390 and 690 may employ any of a wide variety of signaling technologies enabling these computing devices to be coupled to other devices as has been described. Each of these interfaces includes circuitry providing at least some of the requisite functionality to enable such coupling. However, each of these interfaces may also be at least partially implemented with sequences of instructions executed by corresponding ones of the processor components (e.g., to implement a protocol stack or other features). Where electrically and/or optically conductive cabling is employed, these interfaces may employ signaling and/or protocols conforming to any of a variety of industry standards, including without limitation, RS-232C, RS-422, USB, Ethernet (IEEE-802.3) or IEEE-1394. Where the use of wireless signal transmission is entailed, these interfaces may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1xRTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

Figure 4:
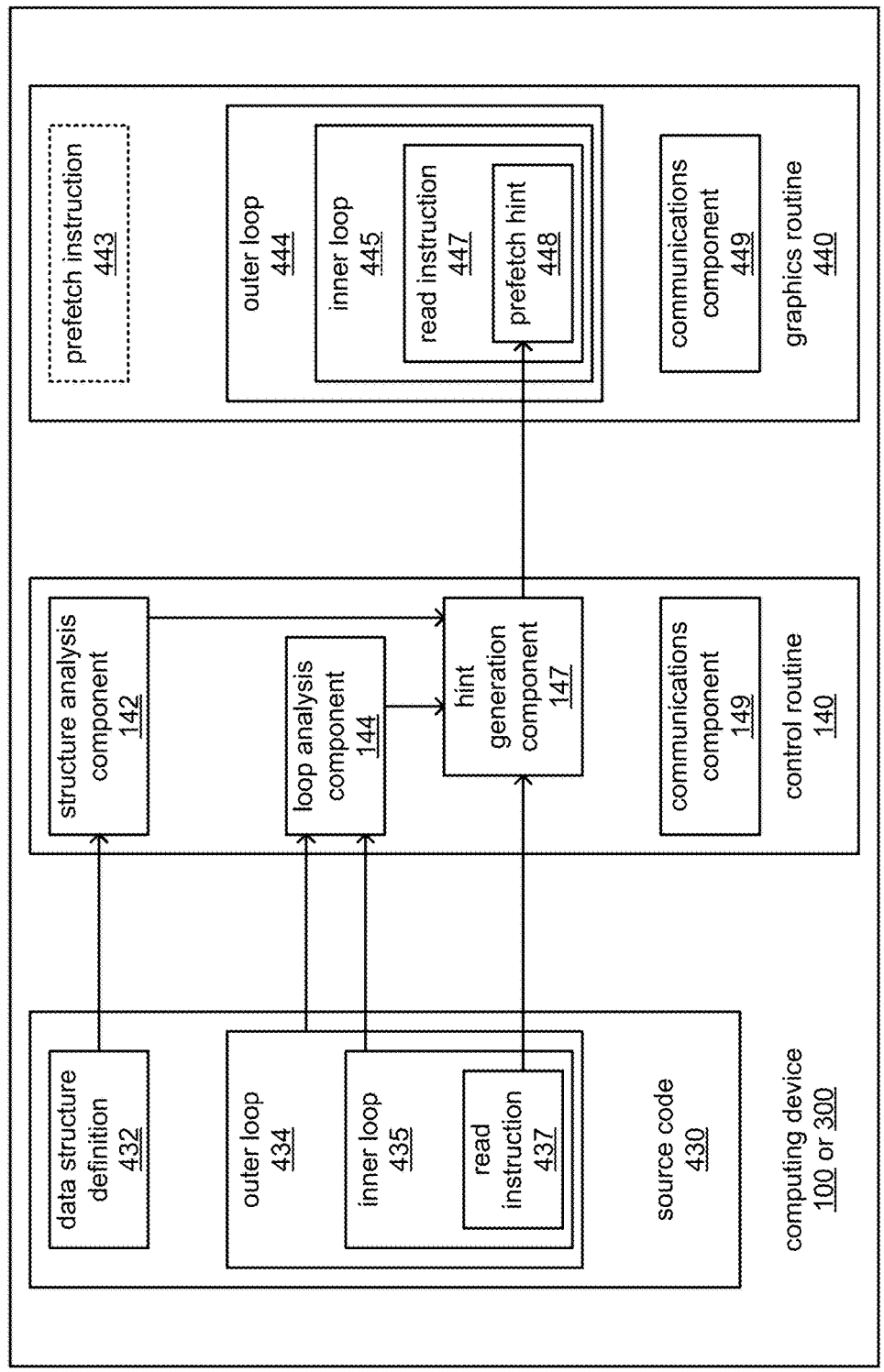
FIGS. 4-5 each illustrate a portion of an embodiment.
Figure 5:
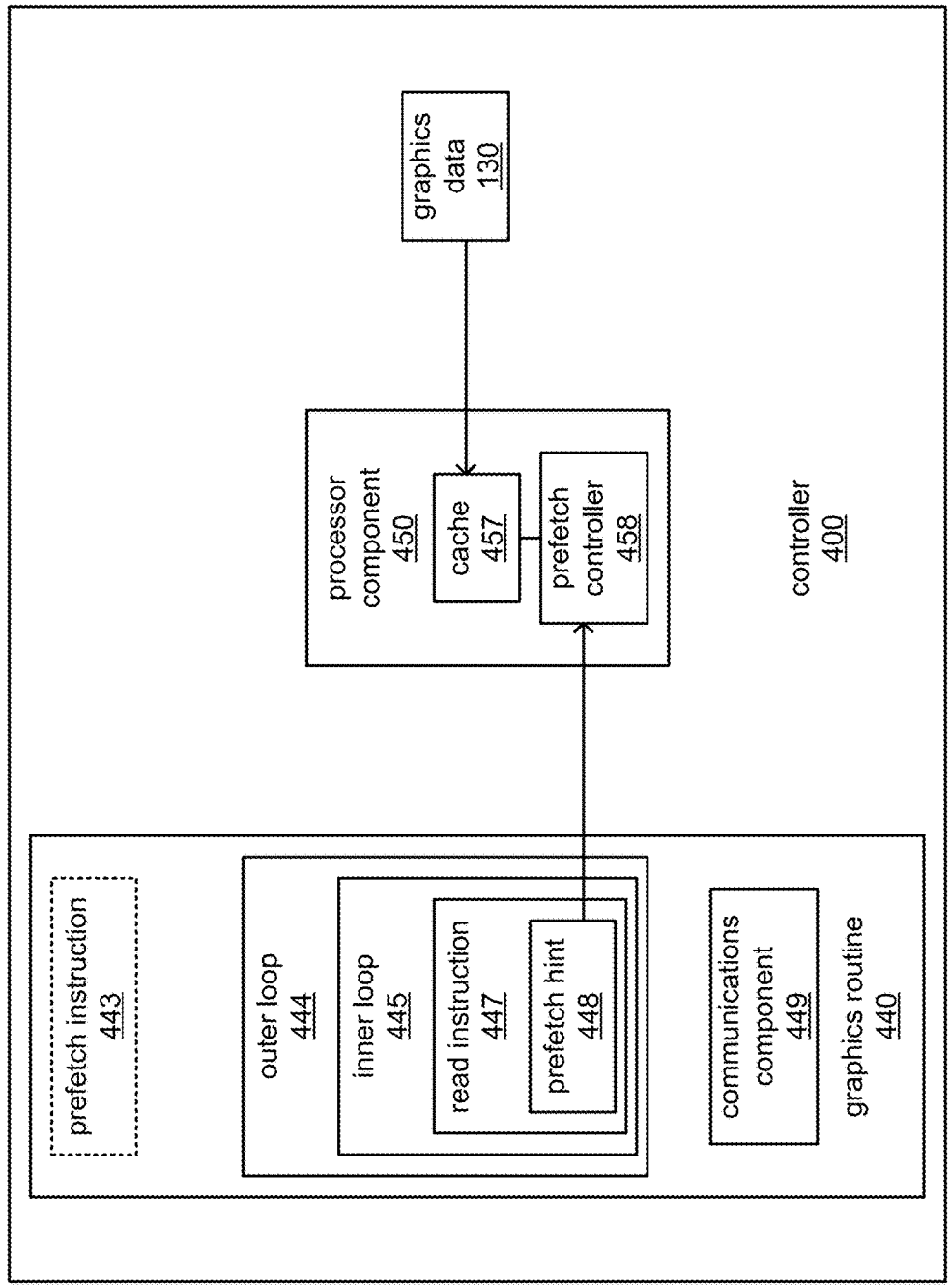

FIGS. 4 and 5 each illustrate a block diagram of a portion of a possible embodiment of the graphics processing system 1000 of FIG. 1 in greater detail. More specifically, FIG. 4 depicts aspects of the operating environment of either the computing device 100 or 300 in which either the processor component 150 or 350, in executing the control routine 140, performs the aforedescribed functions in compiling the source code 430. FIG. 5 depicts aspects of the operating environment of the controller 400 in which the processor component 450, in executing the graphics routine 440, performs the aforedescribed functions in selectively employing a prefetch hint embedded in a read instruction. As will be recognized by those skilled in the art, the control routine 140 and the graphics routine 440, including the components of which each is composed, are selected to be operative on whatever type of processor or processors that are selected to implement applicable ones of the processor components 150, 350 or 450.

In various embodiments, each of the control routine 140 and the graphics routine 440 may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for whatever corresponding ones of the processor components 150, 350 or 450. Where one or more device drivers are included, those device drivers may provide support for any of a variety of other components, whether hardware or software components, of corresponding ones of the computer systems 100 or 300, or the controller 400.

The control routine 140 or the graphics routine may include a communications component 149 or 449, respectively, executable by whatever corresponding ones of the processor components 150, 350 or 450 to operate the interface 190 or 390 to transmit and receive signals via the network 999 as has been described. Among the signals received may be signals conveying the source code 430, the graphics routine 440 and/or the graphics data 130 among one or more of the computing devices 100, 300 or 600 via the network 999. As will be recognized by those skilled in the art, each of these communications components is selected to be operable with whatever type of interface technology is selected to implement corresponding ones of the interfaces 190 and 390.

The control routine 140 includes a loop analysis component 144 executable by either of the processor components 150 or 350 to parse the source code 430 to detect nested loops that include a recurringly executed read instruction, such as the depicted read instruction 437 within an inner loop 435 that is in turn within an outer loop 434. The loop analysis component 144 searches for nested loops in which the read instruction disposed therein is repeatedly executed with each increment or decrement of an index controlling execution of the inner loop 435, and in which the inner loop 435 is caused to recurringly iterate through a range of values for its index with each increment or decrement of another index that controls execution of the outer loop 434. As has been discussed, such nested loops are often employed to retrieve pixel values of pixels in an order that corresponds to an organization of rows and columns into which those pixels may be organized in a pixel map.

The control routine 140 may include a structure analysis component 142 executable by either of the processor components 150 or 350 to parse definitions of data structures in the source code 430, such as the depicted data structure definition 432. The structure analysis component 142 searches for definitions of data structures of a type often associated with the storage of pixel data (e.g., two-dimensional arrays, three-dimensional arrays, etc.).

The control routine 140 includes a hint generation component 147 executable by either of the processor components 150 or 350 to generate and embed a prefetch hint in a read instruction generated in the control routine 440 within nested loops identified by the loop analysis component 144, such as the depicted prefetch hint 448 embedded within a read instruction 447 within an inner loop 445 that is in turn within an outer loop 444. The outer loop 444, the inner loop 445 and the read instruction 447 are generated by the control routine 140 as part of compiling the source code 430, and correspond to the outer loop 434, the inner loop 435 and the read instruction 437, respectively. As the control routine 140 generates the read instruction 447, the hint generation component 147 employs otherwise unused bits making up the read instruction 447 to embed the prefetch hint 448 providing an indication of one or more pixels for which pixel data should be retrieved in a prefetch in addition to whatever pixel data is instructed to be retrieved by the read instruction 447, itself.

Following compiling of the source code 430 to generate the graphics routine 440, instructions generated in the graphics routine 440 are executed by either the processor component 350 or 450, as has been discussed. FIG. 5 depicts execution of the graphics routine 440 by the processor component 450 consistent with what is depicted in FIG. 1. With each execution of the read instruction 447 specifying pixel data of a particular pixel to be retrieved, the prefetch controller 458 of the processor component 450 is recurringly presented with the prefetch hint 448 of what other pixel data of adjacent pixel(s) should also be retrieved and stored in the cache 457 in a prefetch operation.

Stated differently, the read instruction 447 may specify what pixel data is to be retrieved in a read operation by specifying an address of the storage location in which the pixel data of a particular pixel is stored, possibly directly or indirectly via a pointer to an address. However, the bits of the read instruction 447 used in embedding the prefetch hint 448 may encode an indication of what pixel data is to be prefetched with an indication of which one or ones of the pixels adjacent to that particular pixel are the pixels for which pixel data is to be prefetched, instead of providing an indication of an address of a storage location in which the pixel data to be prefetched is stored. In short, those bits may encode an indication to prefetch pixel data associated with "the pixel to the right" or "the pixel below" rather than to the pixel data at the storage location at a specific address.

In this way, the geometric relationship between the particular pixel corresponding to the pixel data being retrieved via the read instruction 447 and one or more pixels corresponding to pixel data to be retrieved in a prefetch operation is used to specify what pixel data is to be prefetched in lieu of addresses. The prefetch controller 458 derives the addresses of storage locations at which pixel data to be prefetched is stored.

Further, given that the pixel data specified to be prefetched is so specified in a prefetch hint, rather than in a prefetch instruction that unconditionally requires the prefetch to occur, the prefetch controller 458 is able to employ other factors beyond the receiving the prefetch hint 448 in determining what data is to next be prefetched to fill a portion of the cache 457. By way of example, the processor component 450 may already be performing a graphics processing operation that currently requires data not already in the cache 457 such that there is an immediate need to obtain that data. In response, the prefetch controller 458 may determine that data at an adjacent storage location to the immediately required data should be prefetched due to an expectation that it will be needed immediately after the currently required data is retrieved. Thus, the prefetch controller 458 may defer acting on the prefetch hint 448 until the more immediate need is satisfied.

In another example, the graphics routine 440 may include a prefetch instruction, such as the depicted prefetch instruction 443, that requires the prefetching of a specific piece of data, and this may arise amidst execution of the nested loops 444 and 445 of the read instruction 447 with its embedded prefetch hint 448. With the prefetch instruction 443 requiring a prefetch operation versus the prefetch hint 448 merely suggesting a prefetch operation, the prefetch controller 458 may determine that the prefetch instruction 443 is of greater priority and execute the prefetch instruction 443 ahead of or in lieu of acting on the prefetch hint 448.

Figure 6:
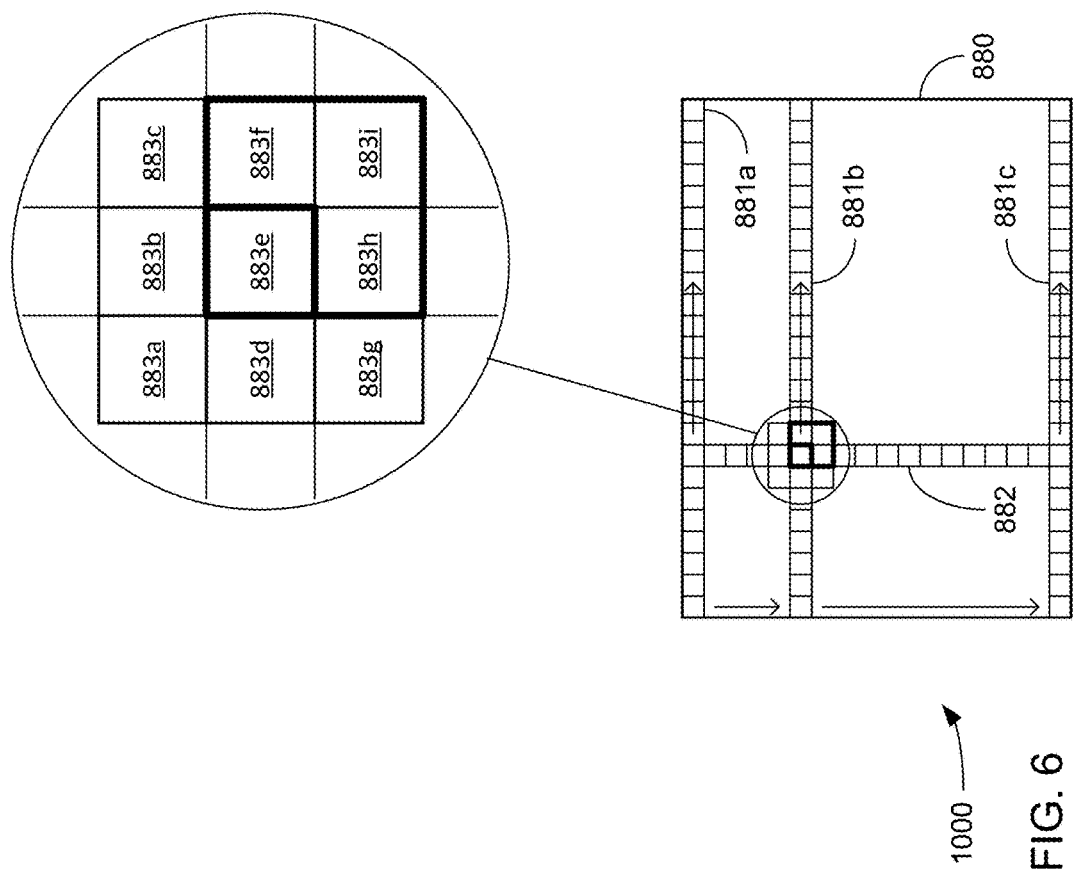
FIGS. 6-7 each illustrate aspects of prefetching according to an embodiment.

Turning briefly to FIG. 6, an example is depicted of execution of the read instruction 447 and the prefetch hint 448 by the processor component 450 of an embodiment of the computing device 300. As depicted, the retrieval of pixel values of the pixels of the pixel map 880 begins with the pixel at the left-most end of the top row 881a, and proceeds rightward through the top row 881a, before proceeding one at a time through adjacent rows from the top row 881a to the bottom row 881c, starting with the pixel at the left-most end of each row.

An example of the read instruction 447 instructing retrieval of the pixel data of the pixel 883e is depicted in the inset within FIG. 6 with the highlighting of the pixel 883e. However, as also indicated with further highlighting that additionally surrounds the pixels 883f and 883h-i, the prefetch hint 448 provides an indication for the further retrieval of the pixel data of the pixels 883f and 883h-i in a prefetch operation in addition to retrieval of the pixel data of the pixel 883e.

The selection of which ones of the pixels 883a-d and 883f-i that are adjacent to the pixel 883e should be the pixels for which pixel data should be prefetched is determined during the compiling of the source code 430 by either the processor component 150 or 350 in executing the control routine 150. This selection is made by the loop analysis component 144 as it parses the nested loops 434 and 435 identified in the source code 430, and within which the read instruction 437 corresponding to the read instruction 447 is located. Through an analysis if the manner in addresses for each storage location are selected for each read operation, the loop analysis component 144 determines the row-column order in which pixel data of the pixels of the pixel map 830 is retrieved, and employs that determination in generating the prefetch hint 448 embedded in the read instruction 447.

Thus, an analysis of the order in which the pixel data for the pixels of the pixel map 880 is to be read in the example depicted in FIG. 6 results in the loop analysis component 144 specifying the adjacent pixel to right, the adjacent pixel below and the adjacent pixel that is diagonally to the right and below the pixel for which pixel data is retrieved via the read instruction 447 are specified as being the three pixels for which pixel data is be prefetched in the prefetch hint 448. Therefore, in executing the read instruction 447 to retrieve the pixel data for the pixel 883e, the accompanying prefetch hint 448 specifies that the pixel data for adjacent pixels 883f and 883h-i should be prefetched.

The fact of these prefetch operations being specified by a prefetch hint, rather than an unconditional prefetch instruction, allows the prefetch controller 458 of the processor component 450 to ignore the prefetch hint 448 in situations where the hint may result in entirely unnecessary prefetch operations. Continuing with the example of FIG. 6, as the retrieval of pixel data progresses to the point at which pixel data for pixels of the bottom row 881c are being retrieved, the prefetch hint 448 may specify that pixel data for pixels below the pixels of the bottom row 881c be retrieved, despite the fact that there are no pixels below the bottom row 881c. The conditional nature of the suggestion to perform prefetch operations of the prefetch hint 448 allows the prefetch controller 458 of the processor component 450 to entirely ignore suggestions to prefetch pixel data for pixels that do not exist.

Figure 7:
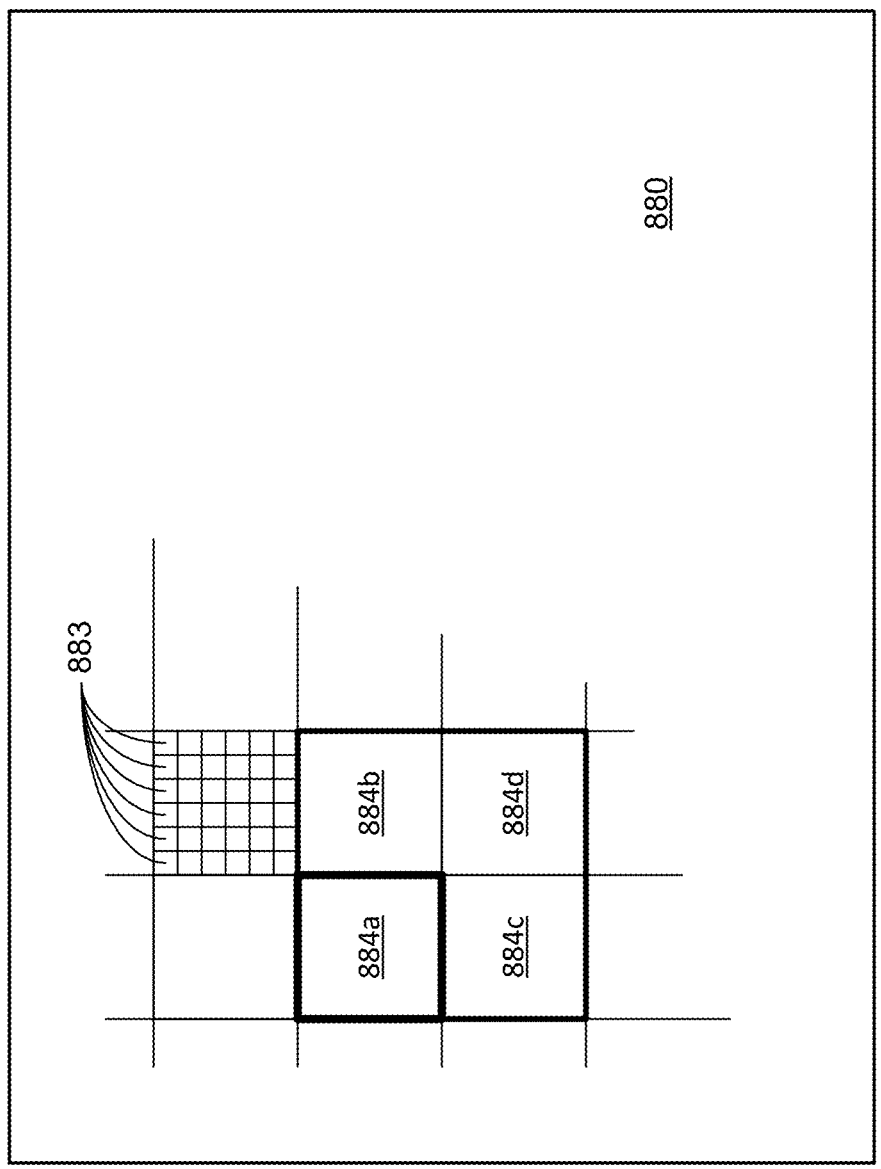

Turning briefly to FIG. 7, an alternate example is depicted of execution of the read instruction 447 and the prefetch hint 448 by the processor component 450 in which the read instruction 447 and the prefetch hint 448 both specify the retrieval of pixel data for multiple pixels, rather than for individual pixels. As depicted in this alternate example, the retrieval of pixel data of the pixels of a macroblock 884a occurs via the read instruction 447, and the retrieval of pixel data of the pixels of adjacent macroblocks 884b-d is indicated in the prefetch hint 448.

As will be familiar to those skilled in the art of graphics processing, processor components incorporating ever wider registers (e.g., 128 bits, 256 bits, 512 bits, etc.) and employing ever wider interfaces have become commonplace. This has spurred the development of register sets that include single-instruction multiple-data (SIMD) registers in which arithmetic, bit-logic and other operations are performed in parallel on multiple operands stored within the same register. As will also be familiar to those skilled in the art of graphics processing, the advent of digital television transmissions and continuing development in digital video storage and playback devices has made the use of digital compression of visual imagery commonplace. This has spurred adoption of such compression standards as joint picture expert group (JPEG) and motion picture experts group (MPEG), both of which process divide bitmaps of visual imagery into blocks of pixels commonly referred to as macroblocks. These developments have made the processing of pixel data of blocks of pixels commonplace such that individual read instructions configured to retrieve pixel data of blocks of pixels are now more commonly used.

Correspondingly, the unused bits of the read instruction 447 of FIG. 7 may be used to indicate one or more adjacent blocks of pixels for which the pixel data is suggested to be retrieved, rather than indicating one or more individual pixels. It should be noted that although the example depicted FIG. 7 specifically refers macroblocks of pixels, which are usually 8×8, 8×16 or 16×16 pixels in size, blocks of pixels of other configurations may be employed in still other possible embodiments.

Figure 8:
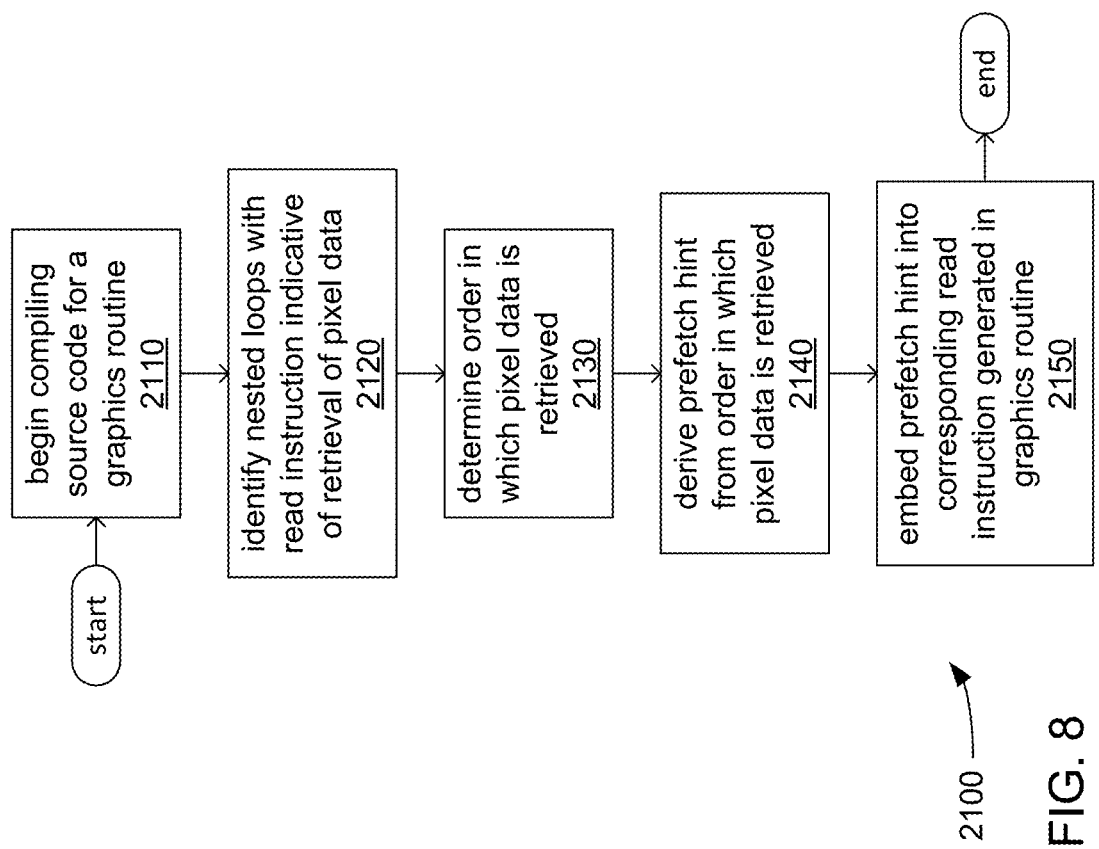
FIGS. 8-9 each illustrate a logic flow according to an embodiment.

FIG. 8 illustrates one embodiment of a logic flow 2100. The logic flow 2100 may be representative of some or all of the operations executed by one or more embodiments described herein. More specifically, the logic flow 2100 may illustrate operations performed by the processor component 150 or 350 in executing at least the control routine 140, and/or performed by other component(s) of the computing device 100 or 300, respectively.

At 2110, a processor component of a computing device (e.g., either the processor component 150 of the computing device 100, or the processor component 350 of the computing device 300) begins compiling a source code (e.g., the source code 430) to generate an executable sequence of instructions of a graphics routine (e.g., the graphics routine 440). As has been discussed, the source code may be made up of human-readable text setting forth instructions to be executed by a processor component (e.g., the processor component 450 of the controller 400).

At 2120, a set of nested loops that include a read instruction in which execution of the nested loops is controlled with indices to cause repeated execution of the read instruction in a manner indicative of retrieving pixel data in an order corresponding with a row-column ordering of the corresponding pixels in a pixel map is identified (e.g., the read instruction 437 within the inner loop 435 that is in turn within the outer loop 434). As discussed, the identification of nested loops employed to retrieve pixel data may include identifying a data structure definition of a type associated with the storage of pixel data of pixels of a pixel map, such as a definition of a two-dimensional array (e.g., the data structure definition 432).

At 2130, the order in which pixel data is retrieved relative to the organization of the corresponding pixels of a pixel map is determined. As has been discussed, the retrieval of pixel data in a manner that follows the row-column organization of pixels in a pixel map may proceed in various ways, such as by rows from a top row down to a bottom row and proceeding in a left-to-right direction within each row (as in the example depicted in FIG. 3), by columns from a left-most column to a right-most column and in a top-to-bottom direction within each column, etc. The manner in which the pixel data to be retrieved is selected for each execution of the read instruction within the nested loops is analyzed to determine this order.

At 2140, a prefetch hint (e.g., the prefetch hint 448) is generated from the order in which pixel data is retrieved, as determined at 2130. More specifically, what adjacent pixels to indicate as suggested to be prefetched in the generated prefetch hint is derived based on that order.

At 2150, the prefetch hint is embedded in a read instruction that is generated as part of generating the graphics routine and that corresponds to the read instruction within the nested loops of the source code. As has been discussed, otherwise unused bits of the read instruction of the graphics routine may be employed to convey the prefetch hint, thereby avoiding the need to define and generate separate and distinct prefetch hint instructions.

Figure 9:
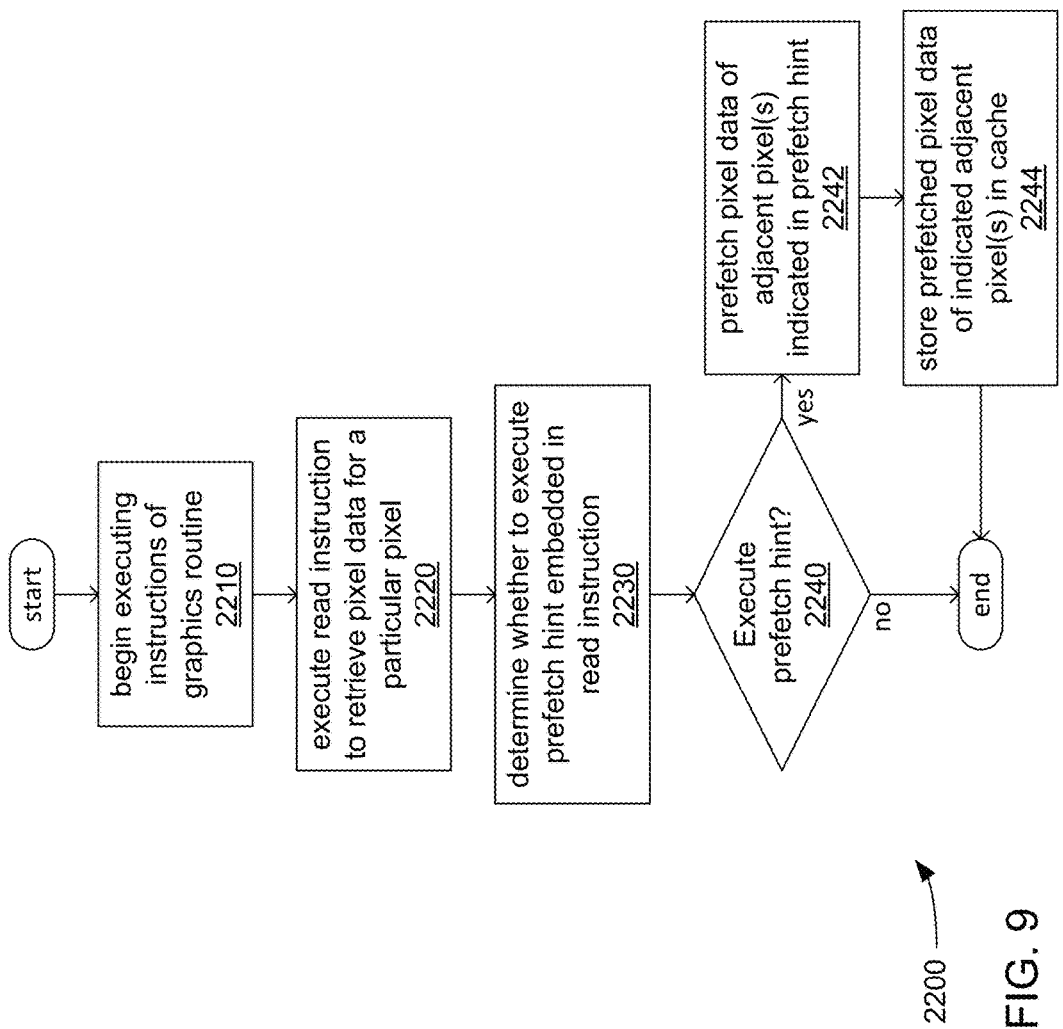

FIG. 9 illustrates one embodiment of a logic flow 2200. The logic flow 2200 may be representative of some or all of the operations executed by one or more embodiments described herein. More specifically, the logic flow 2200 may illustrate operations performed by the processor component 350 or 450 in executing at least the graphics routine 440, and/or performed by other component(s) of the computing device 300, possibly of the controller 400.

At 2210, a processor component of a computing device (e.g., either the processor component 350 or 450 of the computing device 300) begins executing instructions of a graphics routine (e.g., the graphics routine 440) generated by a compiler (e.g., at least a component of the control routine 140) from associated source code (e.g., source code 430). As has been described, the such compiling may have been performed by another processor component of an entirely different computing device (e.g., the processor component 150 of the computing device 100), may have been performed by a different processor component of the same computing device from the processor component that executes it, or by the same processor component that executes it.

At 2220, a read instruction to retrieve pixel data from a storage location of a storage of the computing device (e.g., the storage 360 or 460) for a particular pixel is executed by the processor component. As has been discussed, such a read instruction uses an address to refer to the storage location.

At 2230, a determination is made whether to execute a prefetch hint embedded within that read instruction. As has been discussed, otherwise unused bits of the read instructions may be employed to convey a hint of what pixel(s) adjacent to the particular pixel of the read instruction for which pixel data should be retrieved. As has also been discussed, this indication of pixel data to be retrieved is conveyed as a hint, rather than as an unconditional requirement, to enable a prefetch controller of the processor component (e.g., the prefetch controller 358 or 458).

If at 2240, the determination is made to act on the prefetch hint, then the pixel data of the adjacent pixels indicated in the prefetch hint are retrieved in a prefetch operation at 2242. Following such retrieval, the pixel data retrieved in the prefetch operation is stored in a cache (e.g., the cache 357 or 457) at 2244.

Figure 10:
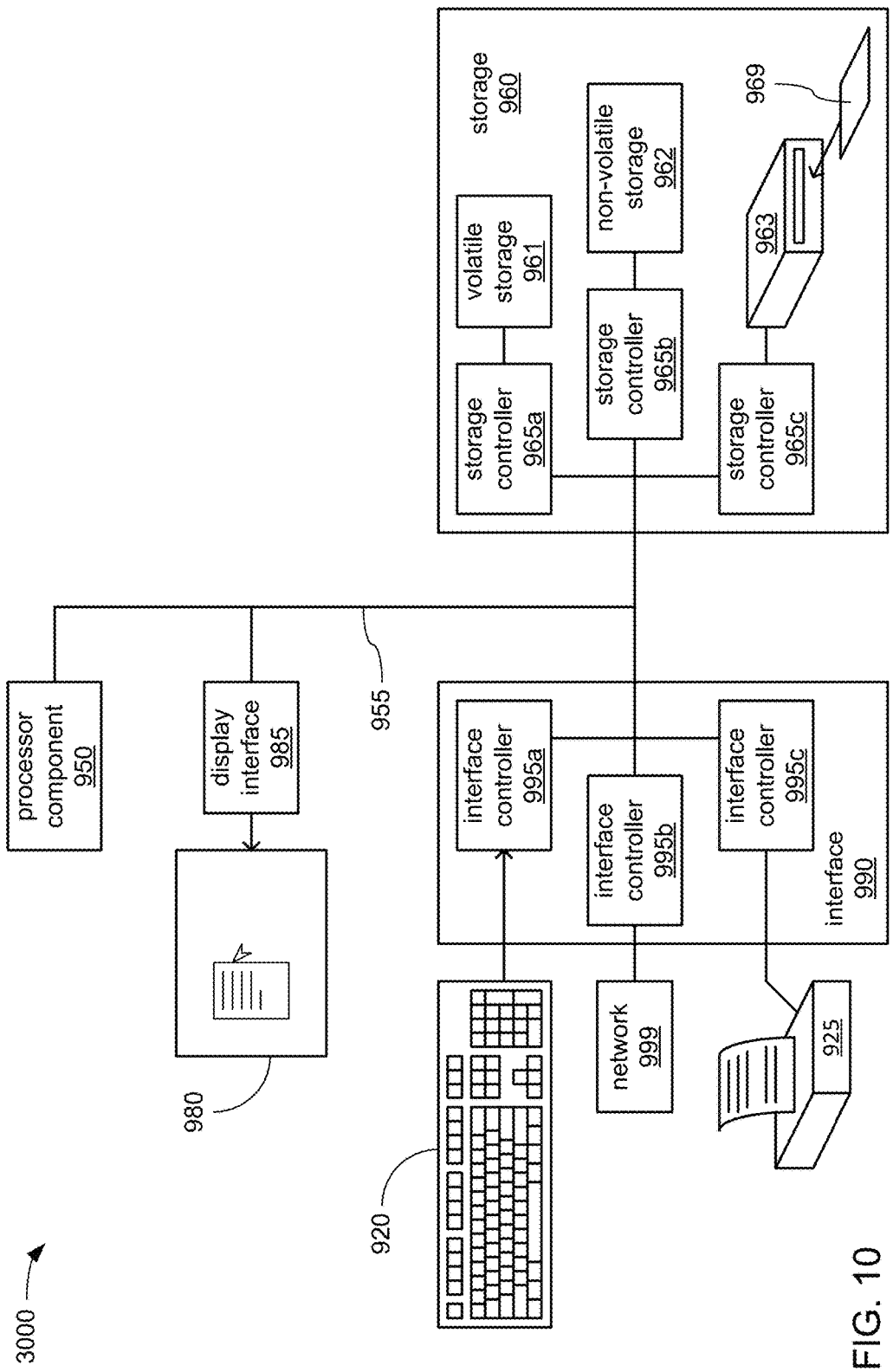
FIG. 10 illustrates a processing architecture according to an embodiment.

FIG. 10 illustrates an embodiment of an exemplary processing architecture 3000 suitable for implementing various embodiments as previously described. More specifically, the processing architecture 3000 (or variants thereof) may be implemented as part of one or more of the computing devices 100, 300, or 600, as well as possibly the controller 400. It should be noted that components of the processing architecture 3000 are given reference numbers in which the last two digits correspond to the last two digits of reference numbers of at least some of the components earlier depicted and described as part of the computing devices 100, 300 and 600, as well as the controller 400. This is done as an aid to correlating components of each.

The processing architecture 3000 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor component, the processor component itself, a storage device (e.g., a hard disk drive, multiple storage drives in an array, etc.) that may employ an optical and/or magnetic storage medium, an software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to one or more signal lines. A message (including a command, status, address or data message) may be one of such signals or may be a plurality of such signals, and may be transmitted either serially or substantially in parallel through any of a variety of connections and/or interfaces.

As depicted, in implementing the processing architecture 3000, a computing device includes at least a processor component 950, a storage 960, an interface 990 to other devices, and a coupling 955. As will be explained, depending on various aspects of a computing device implementing the processing architecture 3000, including its intended use and/or conditions of use, such a computing device may further include additional components, such as without limitation, a display interface 985.

The coupling 955 includes one or more buses, point-to-point interconnects, transceivers, buffers, crosspoint switches, and/or other conductors and/or logic that communicatively couples at least the processor component 950 to the storage 960. Coupling 955 may further couple the processor component 950 to one or more of the interface 990, the audio subsystem 970 and the display interface 985 (depending on which of these and/or other components are also present). With the processor component 950 being so coupled by couplings 955, the processor component 950 is able to perform the various ones of the tasks described at length, above, for whichever one(s) of the aforedescribed computing devices implement the processing architecture 3000. Coupling 955 may be implemented with any of a variety of technologies or combinations of technologies by which signals are optically and/or electrically conveyed. Further, at least portions of couplings 955 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor component 950 (corresponding to the processor components 150, 350 and 650) may include any of a wide variety of commercially available processors, employing any of a wide variety of technologies and implemented with one or more cores physically combined in any of a number of ways.

As previously discussed, the storage 960 (corresponding to the storages 160, 360 and 660) may be made up of one or more distinct storage devices based on any of a wide variety of technologies or combinations of technologies. More specifically, as depicted, the storage 960 may include one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the storage 960 as possibly including multiple distinct types of storage is in recognition of the commonplace use of more than one type of storage device in computing devices in which one type provides relatively rapid reading and writing capabilities enabling more rapid manipulation of data by the processor component 950 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 955 through a storage controller 965a providing an appropriate interface to the volatile storage 961 that perhaps employs row and column addressing, and where the storage controller 965a may perform row refreshing and/or other maintenance tasks to aid in preserving information stored within the volatile storage 961. By way of another example, where the non-volatile storage 962 is present and includes one or more ferromagnetic and/or solid-state disk drives, the non-volatile storage 962 may be communicatively coupled to coupling 955 through a storage controller 965b providing an appropriate interface to the non-volatile storage 962 that perhaps employs addressing of blocks of information and/or of cylinders and sectors. By way of still another example, where the removable media storage 963 is present and includes one or more optical and/or solid-state disk drives employing one or more pieces of machine-readable storage medium 969, the removable media storage 963 may be communicatively coupled to coupling 955 through a storage controller 965c providing an appropriate interface to the removable media storage 963 that perhaps employs addressing of blocks of information, and where the storage controller 965c may coordinate read, erase and write operations in a manner specific to extending the lifespan of the machine-readable storage medium 969.

One or the other of the volatile storage 961 or the non-volatile storage 962 may include an article of manufacture in the form of a machine-readable storage media on which a routine including a sequence of instructions executable by the processor component 950 may be stored, depending on the technologies on which each is based. By way of example, where the non-volatile storage 962 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to storage medium such as a floppy diskette. By way of another example, the non-volatile storage 962 may be made up of banks of solid-state storage devices to store information, such as sequences of instructions, in a manner akin to a compact flash card. Again, it is commonplace to employ differing types of storage devices in a computing device at different times to store executable routines and/or data. Thus, a routine including a sequence of instructions to be executed by the processor component 950 may initially be stored on the machine-readable storage medium 969, and the removable media storage 963 may be subsequently employed in copying that routine to the non-volatile storage 962 for longer term storage not requiring the continuing presence of the machine-readable storage medium 969 and/or the volatile storage 961 to enable more rapid access by the processor component 950 as that routine is executed.

As previously discussed, the interface 990 (possibly corresponding to the interfaces 190, 390 or 690) may employ any of a variety of signaling technologies corresponding to any of a variety of communications technologies that may be employed to communicatively couple a computing device to one or more other devices. Again, one or both of various forms of wired or wireless signaling may be employed to enable the processor component 950 to interact with input/output devices (e.g., the depicted example keyboard 920 or printer 925) and/or other computing devices, possibly through a network (e.g., the network 999) or an interconnected set of networks. In recognition of the often greatly different character of multiple types of signaling and/or protocols that must often be supported by any one computing device, the interface 990 is depicted as including multiple different interface controllers 995a, 995b and 995c. The interface controller 995a may employ any of a variety of types of wired digital serial interface or radio frequency wireless interface to receive serially transmitted messages from user input devices, such as the depicted keyboard 920. The interface controller 995b may employ any of a variety of cabling-based or wireless signaling, timings and/or protocols to access other computing devices through the depicted network 999 (perhaps a network made up of one or more links, smaller networks, or perhaps the Internet). The interface 995c may employ any of a variety of electrically conductive cabling enabling the use of either serial or parallel signal transmission to convey data to the depicted printer 925. Other examples of devices that may be communicatively coupled through one or more interface controllers of the interface 990 include, without limitation, microphones, remote controls, stylus pens, card readers, finger print readers, virtual reality interaction gloves, graphical input tablets, joysticks, other keyboards, retina scanners, the touch input component of touch screens, trackballs, various sensors, a camera or camera array to monitor movement of persons to accept commands and/or data signaled by those persons via gestures and/or facial expressions, laser printers, inkjet printers, mechanical robots, milling machines, etc.

Where a computing device is communicatively coupled to (or perhaps, actually incorporates) a display (e.g., the depicted example display 980, corresponding to the display 380 or 680), such a computing device implementing the processing architecture 3000 may also include the display interface 985. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 985 in a communicative coupling of the display 980 may make use of signaling and/or protocols that conform to any of a variety of industry standards, including without limitation, any of a variety of analog video interfaces, Digital Video Interface (DVI), DisplayPort, etc.

FIG. 11 illustrates an embodiment of a system 4000. In various embodiments, system 4000 may be representative of a system or architecture suitable for use with one or more embodiments described herein, such as the graphics processing system 1000; one or more of the computing devices 100, 300 or 600; and/or one or both of the logic flows 2100 or 2200. The embodiments are not limited in this respect.

As shown, system 4000 may include multiple elements. One or more elements may be implemented using one or more circuits, components, registers, processors, software subroutines, modules, or any combination thereof, as desired for a given set of design or performance constraints. Although FIG. 11 shows a limited number of elements in a certain topology by way of example, it can be appreciated that more or less elements in any suitable topology may be used in system 4000 as desired for a given implementation. The embodiments are not limited in this context.

In embodiments, system 4000 may be a media system although system 4000 is not limited to this context. For example, system 4000 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 4000 includes a platform 4900a coupled to a display 4980. Platform 4900a may receive content from a content device such as content services device(s) 4900c or content delivery device(s) 4900d or other similar content sources. A navigation controller 4920 including one or more navigation features may be used to interact with, for example, platform 4900a and/or display 4980. Each of these components is described in more detail below.

In embodiments, platform 4900a may include any combination of a processor component 4950, chipset 4955, memory unit 4969, transceiver 4995, storage 4962, applications 4940, and/or graphics subsystem 4985. Chipset 4955 may provide intercommunication among processor circuit 4950, memory unit 4969, transceiver 4995, storage 4962, applications 4940, and/or graphics subsystem 4985. For example, chipset 4955 may include a storage adapter (not depicted) capable of providing intercommunication with storage 4962.

Processor component 4950 may be implemented using any processor or logic device, and may be the same as or similar to one or more of processor components 150, 350 or 650, and/or to processor component 950 of FIG. 10.

Memory unit 4969 may be implemented using any machine-readable or computer-readable media capable of storing data, and may be the same as or similar to storage media 969 of FIG. 10.

Transceiver 4995 may include one or more radios capable of transmitting and receiving signals using various suitable wireless communications techniques, and may be the same as or similar to transceiver 995b in FIG. 10.

Display 4980 may include any television type monitor or display, and may be the same as or similar to one or more of displays 380 and 680, and/or to display 980 in FIG. 10.

Storage 4962 may be implemented as a non-volatile storage device, and may be the same as or similar to non-volatile storage 962 in FIG. 10.

Graphics subsystem 4985 may perform processing of images such as still or video for display. Graphics subsystem 4985 may be a graphics processing unit (GPU) or a visual processing unit (VPU), for example. An analog or digital interface may be used to communicatively couple graphics subsystem 4985 and display 4980. For example, the interface may be any of a High-Definition Multimedia Interface, DisplayPort, wireless HDMI, and/or wireless HD compliant techniques. Graphics subsystem 4985 could be integrated into processor circuit 4950 or chipset 4955. Graphics subsystem 4985 could be a stand-alone card communicatively coupled to chipset 4955.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

In embodiments, content services device(s) 4900b may be hosted by any national, international and/or independent service and thus accessible to platform 4900a via the Internet, for example. Content services device(s) 4900b may be coupled to platform 4900a and/or to display 4980. Platform 4900a and/or content services device(s) 4900b may be coupled to a network 4999 to communicate (e.g., send and/or receive) media information to and from network 4999. Content delivery device(s) 4900c also may be coupled to platform 4900a and/or to display 4980.

In embodiments, content services device(s) 4900b may include a cable television box, personal computer, network, telephone, Internet enabled devices or appliance capable of delivering digital information and/or content, and any other similar device capable of unidirectionally or bidirectionally communicating content between content providers and platform 4900a and/display 4980, via network 4999 or directly. It will be appreciated that the content may be communicated unidirectionally and/or bidirectionally to and from any one of the components in system 4000 and a content provider via network 4999. Examples of content may include any media information including, for example, video, music, medical and gaming information, and so forth.

Content services device(s) 4900b receives content such as cable television programming including media information, digital information, and/or other content. Examples of content providers may include any cable or satellite television or radio or Internet content providers. The provided examples are not meant to limit embodiments.

In embodiments, platform 4900a may receive control signals from navigation controller 4920 having one or more navigation features. The navigation features of navigation controller 4920 may be used to interact with a user interface 4880, for example. In embodiments, navigation controller 4920 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 4920 may be echoed on a display (e.g., display 4980) by movements of a pointer, cursor, focus ring, or other visual indicators displayed on the display. For example, under the control of software applications 4940, the navigation features located on navigation controller 4920 may be mapped to virtual navigation features displayed on user interface 4880. In embodiments, navigation controller 4920 may not be a separate component but integrated into platform 4900a and/or display 4980. Embodiments, however, are not limited to the elements or in the context shown or described herein.

In embodiments, drivers (not shown) may include technology to enable users to instantly turn on and off platform 4900a like a television with the touch of a button after initial boot-up, when enabled, for example. Program logic may allow platform 4900a to stream content to media adaptors or other content services device(s) 4900b or content delivery device(s) 4900c when the platform is turned "off." In addition, chip set 4955 may include hardware and/or software support for 5.1 surround sound audio and/or high definition 7.1 surround sound audio, for example. Drivers may include a graphics driver for integrated graphics platforms. In embodiments, the graphics driver may include a peripheral component interconnect (PCI) Express graphics card.

In various embodiments, any one or more of the components shown in system 4000 may be integrated. For example, platform 4900a and content services device(s) 4900b may be integrated, or platform 4900a and content delivery device(s) 4900c may be integrated, or platform 4900a, content services device(s) 4900b, and content delivery device(s) 4900c may be integrated, for example. In various embodiments, platform 4900a and display 4890 may be an integrated unit. Display 4980 and content service device(s) 4900b may be integrated, or display 4980 and content delivery device(s) 4900c may be integrated, for example. These examples are not meant to limit embodiments.

In various embodiments, system 4000 may be implemented as a wireless system, a wired system, or a combination of both. When implemented as a wireless system, system 4000 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 4000 may include components and interfaces suitable for communicating over wired communications media, such as I/O adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 4900a may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 11.

Figure 12:
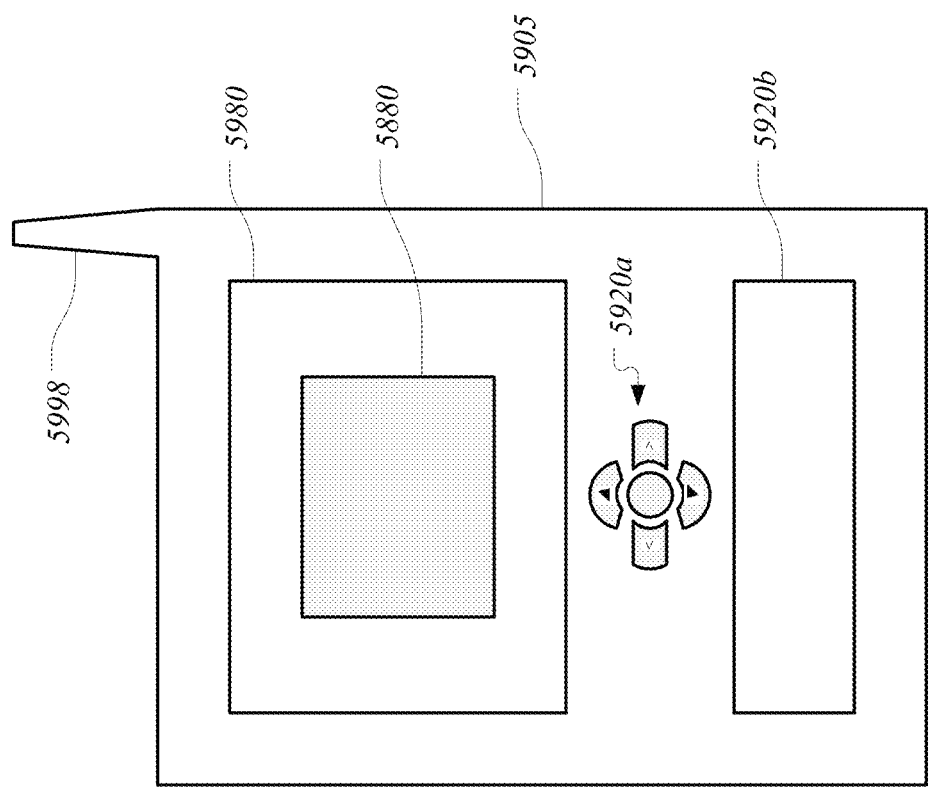
FIG. 12 illustrates an embodiment of a device.

As described above, system 4000 may be embodied in varying physical styles or form factors. FIG. 12 illustrates embodiments of a small form factor device 5000 in which system 4000 may be embodied. In embodiments, for example, device 5000 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 12, device 5000 may include a display 5980, a navigation controller 5920a, a user interface 5880, a housing 5905, an I/O device 5920b, and an antenna 5998. Display 5980 may include any suitable display unit for displaying information appropriate for a mobile computing device, and may be the same as or similar to display 4980 in FIG. 11. Navigation controller 5920a may include one or more navigation features which may be used to interact with user interface 5880, and may be the same as or similar to navigation controller 4920 in FIG. 11. I/O device 5920b may include any suitable I/O device for entering information into a mobile computing device. Examples for I/O device 5920b may include an alphanumeric keyboard, a numeric keypad, a touch pad, input keys, buttons, switches, rocker switches, microphones, speakers, voice recognition device and software, and so forth. Information also may be entered into device 5000 by way of a microphone. Such information may be digitized by a voice recognition device. The embodiments are not limited in this context.

More generally, the various elements of the computing devices described and depicted herein may include various hardware elements, software elements, or a combination of both. Examples of hardware elements may include devices, logic devices, components, processors, microprocessors, circuits, processor components, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

An example of a device to enable pixel data prefetches includes a processor component, and a hint generation component for execution by the processor component to embed a prefetch hint in an executable read instruction, the executable read instruction to retrieve pixel data of a specified pixel and the prefetch hint to retrieve pixel data of an adjacent pixel that is geometrically adjacent to the specified pixel.

The above example of a device in which the pixel data of the specified pixel and the pixel data of the adjacent pixel are stored in noncontiguous storage locations of a storage.

Either of the above examples of a device in which the device includes a compiler for execution by the processor component to compile a source code to generate a graphics routine comprising the executable read instruction, the executable read instruction corresponding to a read instruction of the source code.

Any of the above examples of a device in which the device includes a loop analysis component for execution by the processor component to identify nested loops in the source code to cause repeated execution of the read instruction to retrieve pixel data of multiple pixels of a pixel map, and generate instructions in the graphics routine to implement the nested loops.

Any of the above examples of a device in which the loop analysis component is to analyze a first index of an outer loop of the nested loops and a second index of an inner loop of the nested loops to determine an order in which the specified pixel is selected in a row-column organization of the multiple pixels in the pixel map in each execution of the read instruction, and determine the adjacent pixel of the prefetch hint.

Any of the above examples of a device in which the device includes a structure analysis component for execution by the processor component to analyze a data structure definition of the source code to identify the nested loops.

Any of the above examples of a device in which the compiler is to generate the graphics routine to be executable by another processor component of one of a computing device or a controller of the device.

Any of the above examples of a device in which the device includes an interface to couple the processor component to a network, and a communications component for execution by the processor component to transmit the graphics routine to the computing device via the network.

Any of the above examples of a device in which the device includes a display, the processor component to visually present an image derived from a pixel map comprising the specified pixel and the adjacent pixel on the display.

Any of the above examples of a device in which the adjacent pixel indicated in the prefetch hint as one of a pixel above the specified pixel, a pixel below the specified pixel, a pixel to the left of the specified pixel, a pixel to the right of the specified pixel, a pixel diagonally above and to the left of the specified pixel, a pixel diagonally above to the right of the specified pixel, a pixel diagonally below and to the left of the specified pixel, and a pixel diagonally below and to the right of the specified pixel.

An example of another device to selectively prefetch pixel data includes a prefetch controller of a processor component to determine whether to execute a prefetch hint embedded in an executable read instruction, the executable read instruction to retrieve pixel data of a specified pixel and the prefetch hint to retrieve pixel data of an adjacent pixel that is geometrically adjacent to the specified pixel.

The above example of another device in which the device includes a storage accessible to the processor component, the pixel data of the specified pixel stored in a first storage location of the storage, the pixel data of the adjacent pixel stored a second storage location of the storage that is noncontiguous with the first storage location.

Either of the above examples of another device in which the executable read instruction indicates a first address of the first storage location, and the prefetch hint indicates a position of the second pixel relative to a position of the first pixel in a pixel map.

Any of the above examples of another device in which 14. The device of claim 13, the prefetch controller to derive a second address of the second storage location from the position of the second pixel relative to the first pixel.

Any of the above examples of another device in which the position of the second pixel relative to the first pixel indicated in the prefetch hint as one of a pixel above the specified pixel, a pixel below the specified pixel, a pixel to the left of the specified pixel, a pixel to the right of the specified pixel, a pixel diagonally above and to the left of the specified pixel, a pixel diagonally above to the right of the specified pixel, a pixel diagonally below and to the left of the specified pixel, and a pixel diagonally below and to the right of the specified pixel.

Any of the above examples of another device in which the prefetch controller is to determine whether the adjacent pixel exists in the pixel map to determine whether to execute the prefetch hint.

Any of the above examples of another device in which unused bits of the executable read instruction are employed to embed the prefetch hint in the executable read instruction.

Any of the above examples of another device in which the device includes a storage and a cache accessible to the processor component, and the prefetch controller is to retrieve the pixel data of the adjacent pixel from the storage and to store the pixel data of the adjacent pixel in the cache in response to a determination to execute the prefetch hint.

Any of the above examples of another device in which the prefetch controller is to determine whether to prioritize an unconditional prefetch instruction ahead of the prefetch hint to determine whether to execute the prefetch hint.

Any of the above examples of another device in which the device includes a compiler for execution by the processor component to generate the executable read instruction and the prefetch hint in a graphics routine from a source code.

Any of the above examples of another device in which the device includes a display, the processor component to visually present an image derived from a pixel map comprising the specified pixel and the adjacent pixel on the display.

Any of the above examples of another device in which the device includes an interface to couple the processor component to a network, and a communications component to transmit a pixel map comprising the specified pixel and the adjacent pixel to a computing device via the network.

An example of a computer-implemented method of enabling pixel data prefetches includes compiling a source code to generate a graphics routine comprising an executable read instruction corresponding to a read instruction of the source code, and embedding a prefetch hint in the executable read instruction, the executable read instruction to retrieve pixel data of a specified pixel and the prefetch hint to retrieve pixel data of an adjacent pixel that is geometrically adjacent to the specified pixel.

The above example of a computer-implemented method in which the pixel data of the specified pixel and the pixel data of the adjacent pixel stored in noncontiguous storage locations of a storage.

Either of the above examples of a computer-implemented method in which the method includes identifying nested loops in the source code to cause repeated execution of the executable read instruction to retrieve pixel data of multiple pixels of a pixel map, and generating instructions in the graphics routine to implement the nested loops.

Any of the above examples of a computer-implemented method in which the method includes analyzing a definition in the source code of a data structure associated with the nested loops to identify the nested loops.

Any of the above examples of a computer-implemented method in which the method includes analyzing a first index of an outer loop of the nested loops and a second index of an inner loop of the nested loops to determine an order in which the specified pixel is selected in a row-column organization of the multiple pixels in each execution of the read instruction; and determining the adjacent pixel from the order.

Any of the above examples of a computer-implemented method in which the method includes employing unused bits of the executable read instruction to embed the prefetch hint.

Any of the above examples of a computer-implemented method in which the method includes at least one of transmitting the graphics routine to a computing device, executing the graphics routine, and visually presenting an image derived from a pixel map comprising the selected pixel and the adjacent pixel on a display.

An example of an apparatus to enable pixel data prefetches includes means for performing any of the above examples of a computer-implemented method.

An example of at least one machine readable storage medium includes instructions that when executed by a computing device, causes the computing device to perform any of the above examples of a computer-implemented method.

An example of another computer-implemented method of selectively prefetching pixel data includes determining whether to execute a prefetch hint embedded in an executable read instruction, the executable read instruction to retrieve pixel data of a specified pixel and the prefetch hint to retrieve pixel data of an adjacent pixel that is geometrically adjacent to the specified pixel.

The above example of another computer-implemented method in which unused bits of the executable read instruction are employed to embed the prefetch hint in the executable read instruction, the method comprising executing the executable read instruction.

Either of the above examples of another computer-implemented method in which the method includes retrieving the pixel data of the adjacent pixel and storing the pixel data of the adjacent pixel data in the cache in response to a determination to execute the prefetch hint.

Any of the above examples of another computer-implemented method in which the pixel data of the specified pixel is stored in a first storage location of a storage, the pixel data of the adjacent pixel is stored in second storage location of the storage that is noncontiguous with the first storage location, the read instruction indicates a first address of the first storage location, the prefetch hint indicates a position of the second pixel relative to the first pixel in a pixel map, and the method includes deriving a second address of the second storage location from the position of the second pixel relative to the first pixel.

Any of the above examples of another computer-implemented method in which the method includes determining whether the adjacent pixel exists in the pixel map to determine whether to execute the prefetch hint.

Any of the above examples of another computer-implemented method in which the method includes at least one of transmit an image derived from the pixel map to a computing device, and visually presenting an image derived from the pixel map on a display.

An example of another apparatus to selectively prefetch pixel data includes means for performing any of the above examples of another computer-implemented method.

Another example of at least one machine readable storage medium includes instructions that when executed by a computing device, causes the computing device to perform any of the above examples of another computer-implemented method.

An example of at least one machine-readable storage medium includes instructions that when executed by a computing device, cause the computing device to compile a source code to generate a graphics routine comprising an executable read instruction corresponding to a read instruction of the source code, and embed a prefetch hint in the executable read instruction, the executable read instruction to retrieve pixel data of a specified pixel and the prefetch hint to retrieve pixel data of an adjacent pixel that is geometrically adjacent to the specified pixel.

The above example of at least one machine-readable storage medium in which the computing device is caused to identify nested loops in the source code to cause repeated execution of the executable read instruction to retrieve pixel data of multiple pixels of a pixel map, and generate instructions in the graphics routine to implement the nested loops.

Either of the above examples of at least one machine-readable storage medium in which the computing device is caused to analyzing a definition in the source code of a data structure associated with the nested loops to identify the nested loops.

Any of the above examples of at least one machine-readable storage medium in which the computing device is caused to analyze a first index of an outer loop of the nested loops and a second index of an inner loop of the nested loops to determine an order in which the specified pixel is selected in a row-column organization of the multiple pixels in each execution of the read instruction, and determine the adjacent pixel from the order.

Any of the above examples of at least one machine-readable storage medium in which the computing device is caused to execute the graphics routine or visually present an image derived from a pixel map comprising the specified pixel and the adjacent pixel on a display of the computing device.

Another example of at least one machine-readable storage medium includes instructions that when executed by a computing device, cause the computing device to determine whether to execute a prefetch hint embedded in an executable read instruction, the executable read instruction to retrieve pixel data of a specified pixel and the prefetch hint to retrieve pixel data of an adjacent pixel that is geometrically adjacent to the specified pixel.

The above other example of at least one machine-readable storage medium in which unused bits of the executable read instruction are employed to embed the prefetch hint in the executable read instruction, the computing device caused to execute the executable read instruction.

Either of the above other examples of at least one machine-readable storage medium in which the computing device is caused to retrieve the pixel data of the adjacent pixel and store the pixel data of the adjacent pixel data in the cache in response to a determination to execute the prefetch hint.

Any of the above other examples of at least one machine-readable storage medium in which the pixel data of the specified pixel is stored in a first storage location of a storage of the computing device, the pixel data of the adjacent pixel is stored in second storage location of the storage that is noncontiguous with the first storage location, the read instruction indicates a first address of the first storage location, the prefetch hint indicates a position of the second pixel relative to the first pixel in a pixel map, and the computing device is caused to derive a second address of the second storage location from the position of the second pixel relative to the first pixel.

Any of the above other examples of at least one machine-readable storage medium in which the computing device is caused to determine whether the adjacent pixel exists in the pixel map to determine whether to execute the prefetch hint.

Any of the above other examples of at least one machine-readable storage medium in which the computing device is caused to determine whether to prioritize an unconditional prefetch instruction ahead of the prefetch hint to determine whether to execute the prefetch hint.

Any of the above other examples of at least one machine-readable storage medium in which the computing device is caused to executing the graphics routine or visually present an image derived from a pixel map comprising the specified pixel and the adjacent pixel on a display of the computing device.

The invention claimed is:

1. A device comprising:
a processor component; and
a compiler for execution by the processor component to:
compile a source code to generate a graphics routine comprising an executable read instruction corresponding to a read instruction of the source code, the executable read instruction comprising one or more bits having an embedded prefetch hint, the executable read instruction to retrieve pixel data of a specified pixel, and the embedded prefetch hint to retrieve pixel data of an adjacent pixel that is geometrically adjacent to the specified pixel,
identify nested loops in the source code in which the read instruction is repeatedly executed to retrieve pixel data in an order corresponding with row-column ordering of multiple pixels of a pixel map,
generate instructions in the graphics routine to implement the nested loops, and
determine the embedded prefetch hint based on the nested loops identified in the source code and the order to retrieve pixel data, the order corresponding with row-column ordering of the multiple pixels of the pixel map.

2. The device of claim 1, the pixel data of the specified pixel and the pixel data of the adjacent pixel stored in noncontiguous storage locations of a storage.

3. The device of claim 1, the loop analysis component to:
analyze a first index of an outer loop of the nested loops and a second index of an inner loop of the nested loops to determine the order corresponding with the row-column ordering of the multiple pixels of the pixel map.

4. The device of claim 1, the compiler for execution by the processor component to identify nested loops in the source code in which the read instruction is recurringly executed to retrieve pixel data in the order corresponding with row-column ordering of multiple pixels of the pixel map.

5. The device of claim 1, the compiler for execution by the processor component to identify nested loops in the source code having a read instruction within an inner loop and the inner loop is within an outer loop.

6. The device of claim 5, the compiler for execution by the processor component to identify nested loops in the source code in which the read instruction is repeatedly executed with each increment or decrement of an inner index controlling execution of the inner loop, the inner loop to iterate through a range of values for the inner index with each increment or decrement of an outer index controlling execution of the outer loop.

7. The device of claim 1, the embedded prefetch hint comprising a non-required conditional instruction to retrieve the pixel data.

8. The device of claim 1, comprising a prefetch controller to determine whether to prioritize an unconditional prefetch instruction ahead of the embedded prefetch hint.

9. A device comprising:
first processing circuitry to execute a compiler to:
compile source code to generate a graphics routine comprising an executable read instruction corresponding to a read instruction of the source code, the executable read instruction to comprise one or more bits having an embedded prefetch hint, the executable read instruction to retrieve pixel data of a specified pixel and the embedded prefetch hint to retrieve pixel data of an adjacent pixel that is geometrically adjacent to the specified pixel, the compiler to identify nested loops in the source code in which the read instruction is repeatedly executed;
retrieve pixel data in an order corresponding with row-column ordering of multiple pixels of a pixel map and generate instructions in the graphics routine to implement the nested loops; and
determine the embedded prefetch hint based on analysis of the identified nested loops and the order to retrieve the pixel data; and
second processing circuitry to execute a prefetch controller to determine whether to execute the embedded prefetch hint embedded in the executable read instruction, the executable read instruction to retrieve pixel data of a specified pixel.

10. The device of claim 9, comprising a storage accessible to the processor component, the pixel data of the specified pixel stored in a first storage location of the storage, the pixel data of the adjacent pixel stored in a second storage location of the storage that is noncontiguous with the first storage location.

11. The device of claim 10, the executable read instruction indicating a first address of the first storage location, and the embedded prefetch hint indicating a position of the second pixel relative to a position of the first pixel in a pixel map.

12. The device of claim 11, the prefetch controller to determine whether the adjacent pixel exists in the pixel map to determine whether to execute the embedded prefetch hint.

13. The device of claim 9, the compiler for execution by the processor component to identify nested loops in the source code in which the read instruction is recurringly executed to retrieve pixel data in the order corresponding with row-column ordering of the multiple pixels of the pixel map.

14. The device of claim 9, the compiler for execution by the first processing circuitry to identify nested loops in the source code having a read instruction within an inner loop and the inner loop is within an outer loop.

15. The device of claim 14, the compiler for execution by the first processing circuitry to identify nested loops in the source code in which the read instruction is repeatedly executed with each increment or decrement of an inner index controlling execution of the inner loop, the inner loop to iterate through a range of values for the inner index with each increment or decrement of an outer index controlling execution of the outer loop.

16. The device of claim 9, the embedded prefetch hint comprising a non-required conditional instruction to retrieve the pixel data.

17. The device of claim 9, the prefetch controller to determine whether to prioritize an unconditional prefetch instruction ahead of the embedded prefetch hint.

18. A computer-implemented method comprising:
identifying, by processing circuitry, nested loops in source code in which a read instruction is repeatedly executed;
retrieving pixel data in an order corresponding with row-column ordering of multiple pixels of a pixel map and generating instructions in a graphics routine to implement the nested loops;
compiling the source code to generate a graphics routine comprising an executable read instruction corresponding to the read instruction of the source code, the executable read instruction comprising one or more bits having an embedded prefetch hint determined based on the order corresponding with row-column ordering of the multiple pixels of the pixel map; and determining whether to execute the embedded prefetch hint, the executable read instruction to retrieve pixel data of a specified pixel and the embedded prefetch hint to retrieve pixel data of an adjacent pixel that is geometrically adjacent to the specified pixel.

19. The computer-implemented method of claim 18, comprising identifying nested loops in the source code in which the read instruction is recurringly executed to retrieve pixel data in the order corresponding with row-column ordering of the multiple pixels of the pixel map.

20. The computer-implemented method of claim 18, comprising identifying nested loops in the source code having a read instruction within an inner loop and the inner loop is within an outer loop.

21. The computer-implemented method of claim 20, comprising identifying nested loops in the source code in which the read instruction is repeatedly executed with each increment or decrement of an inner index controlling execution of the inner loop, the inner loop to iterate through a range of values for the inner index with each increment or decrement of an outer index controlling execution of the outer loop.

22. The computer-implemented method of claim 18, the embedded prefetch hint comprising a non-required conditional instruction to retrieve the pixel data.

23. The computer-implemented method of claim 18, comprising determining whether to prioritize an unconditional prefetch instruction ahead of the embedded prefetch hint.

24. At least one machine-readable non-transitory storage medium comprising instructions that when executed by a computing device, cause the computing device to:

compile source code to generate a graphics routine comprising an executable read instruction corresponding to a read instruction of the source code, the executable read instruction to comprise one or more bits having an embedded prefetch hint and to retrieve pixel data of a specified pixel, the compilation of the source code to comprise identifying nested loops in the source in which the read instruction is repeatedly executed and determining the embedded prefetch hint based on an order corresponding with row-column ordering of multiple pixels of the pixel map; and retrieve pixel data in the order corresponding with row-column ordering of the multiple pixels of the pixel map and generate instructions in the graphics routine to implement the nested loops;

the executable read instruction to retrieve pixel data of a specified pixel and the embedded prefetch hint to retrieve pixel data of an adjacent pixel that is geometrically adjacent to the specified pixel.

25. The at least one machine-readable non-transitory storage medium of claim 24, the computing device caused to identify nested loops in the source code in which the read instruction is repeatedly executed with each increment or decrement of an inner index controlling execution of the inner loop, the inner loop to iterate through a range of values for the inner index with each increment or decrement of an outer index controlling execution of the outer loop.

\* \* \* \* \*